(12) United States Patent
Takada

(10) Patent No.: US 6,760,436 B1
(45) Date of Patent: Jul. 6, 2004

(54) ECHO CANCELING APPARATUS DETERMINING DYNAMICALLY CHANGING ECHO COMPONENT

(75) Inventor: Masashi Takada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/547,051

(22) Filed: Apr. 10, 2000

(30) Foreign Application Priority Data

Nov. 17, 1999 (JP) ............................................ 11-326478

(51) Int. Cl.[7] .............................................. H04M 9/08
(52) U.S. Cl. ............................ 379/406.01; 379/406.02; 379/406.05; 379/406.06; 379/406.08; 379/406.09
(58) Field of Search ........................ 379/406.01–406.16

(56) References Cited

U.S. PATENT DOCUMENTS 4,742,510 A * 5/1988 Quatieri, Jr. et al.
4,935,919 A * 6/1990 Hiraguchi
5,375,147 A * 12/1994 Awata et al.
5,610,909 A    3/1997 Shaw
5,852,661 A * 12/1998 Chen

FOREIGN PATENT DOCUMENTS

JP              8-331022        12/1996

* cited by examiner

Primary Examiner—F. W. Isen
Assistant Examiner—Ramnandan Singh
(74) Attorney, Agent, or Firm—Venable LLP; Michael A. Sartori, Ph.D.; Daniel G. Vivarelli, Jr.

(57) ABSTRACT

An echo canceling apparatus includes a long-response echo canceler that removes an echo of an incoming signal from an outgoing signal by operating on a most recent segment of the incoming signal, stored in a tapped delay unit. The apparatus has a control unit that calculates a cancellation characteristic for each tap of the tapped delay unit. The cancellation characteristics are used to select a subset of taps corresponding to a changing component of the echo, the subset being empty if there is no changing component. A short-response echo canceler, operating on the outputs of the selected taps, cancels the changing component of the echo left uncanceled by the long-response echo canceler. Alternatively, the step gain of the selected taps is increased. The short-response echo canceler is preferably disabled in the double-talk state.

12 Claims, 17 Drawing Sheets

ECHO CANCELING APPARATUS DETERMINING DYNAMICALLY CHANGING ECHO COMPONENT

BACKGROUND OF THE INVENTION

The present invention relates to an echo canceling apparatus that deals separately with changing and unchanging echo components.

U.S. Pat. No. 5,610,909 discloses an echo canceling apparatus of this type. Referring to FIG. 1, in one embodiment, the apparatus comprises an input terminal 200 coupled to a loudspeaker 201, a microphone 202 coupled to an output terminal 203, a long-response echo canceler 204, a delay adjustment generator 205, an adjustable delay unit 206, and a short-response echo canceler 207. An incoming electrical signal received at the input terminal 200 is supplied to the adjustable delay unit 206, long-response echo canceler 204, and loudspeaker 201. The loudspeaker 201 converts the incoming signal to an acoustic signal, part of which is picked up as an echo by the microphone 202. The long-response echo canceler 204 generates a first estimated echo or echo replica signal from the incoming signal, by synthesizing a long impulse response of the echo path from the loudspeaker 201 to the microphone 202, and subtracts the first echo replica signal from the microphone output signal. The adjustable delay unit 206 delays the incoming signal by an amount determined by the delay adjustment generator 205 on the basis of the impulse response synthesized by the long-response echo canceler 204. The short-response echo canceler 207 generates a second echo replica signal from the delayed incoming signal, by synthesizing a short impulse response of the echo path. The short-response echo canceler 207 subtracts the second echo replica signal from the output of the long-response echo canceler 204, and supplies the resulting outgoing signal to the output terminal 203.

Both echo cancelers adapt their impulse responses to changes in the echo path, but the short-response echo canceler 207 adapts more quickly than the long-response echo canceler 204. The echo typically has a relatively long, substantially unchanging first component due to acoustic reflection from stationary surfaces such as walls, and a mostly shorter, rapidly changing second component due to acoustic reflection from a moving person or moving object. The long-response echo canceler 204 accurately cancels the first component, the delay adjustment generator 205 determines the relative position of the second component within the first component, and the short-response echo canceler 207 cancels the second component.

The long and short impulse responses are normally synthesized as tap coefficients of respective adaptive filters. In this context, 'long' and 'short' mean that the long-response echo canceler 204 has more tap coefficients than the short-response echo canceler 207. The delay adjustment generator 205 operates by, for example, detecting the position of the largest or most variable tap coefficient of the long-response echo canceler 204, and centering the tap coefficients of the short-response echo canceler 207 around that position.

One problem observed in this apparatus is that when it is employed in a small enclosed acoustic environment, such as a small room or the cabin of an automobile, the echo often has little or no rapidly changing component. When the rapidly changing component is absent, nothing is gained from the use of two separate echo cancelers, and there is a significant power-consumption penalty.

A second problem is that a short-response echo canceler is less accurate than a long-response echo canceler. When the rapidly changing echo component is small or absent, the short-response echo canceler 207 may degrade, rather than improve, the quality of the outgoing signal.

A third problem is that while the impulse response synthesized by the short-response echo canceler 207 has a fixed length, the rapidly varying echo component does not. Thus at some times, the second echo replica signal may be too short to cancel all of the rapidly changing echo component. At other times, the second echo replica signal may be too long, and may degrade the outgoing signal by inaccurately attempting to cancel a non-existent echo component.

A fourth problem arises in the double-talk state, when both the near-end and far-end parties speak at once. In this state, the echo cancelers 204, 207 cannot adapt correctly to changes in the echo path. In particular, the short-response echo canceler 207 cannot track the rapidly changing echo component. To worsen matters, during and after the double-talk state, the delay adjustment generator 205 may misjudge the position of the rapidly changing component, completely invalidating the output of the short-response echo canceler 207 and severely degrading the outgoing signal. The resulting harm to signal quality can far exceed the benefit obtained when the delay adjustment generator 205 and short-response echo canceler 207 operate correctly.

SUMMARY OF THE INVENTION

One object of the present invention is to cancel a changing echo component of variable length.

Another object of the invention is to reduce power consumption.

Another object is to avoid signal-quality degradation caused by unnecessary echo cancellation.

Another object is to avoid signal-quality degradation caused by erroneous cancellation of a changing echo component in the double-talk state.

The invented echo canceling apparatus has a tapped delay unit that stores a plurality of most recent samples of an incoming signal. A long-response echo canceler generates a first echo replica signal from the stored samples, which are output from the taps of the tapped delay unit, and subtracts the first echo replica signal from an outgoing signal to cancel an echo of the incoming signal, obtaining a residual signal.

According to a first aspect of the invention, the apparatus also has a control unit that calculates an echo cancellation characteristic for each tap of the tapped delay unit, thereby identifying taps corresponding to a changing component of the echo. The number of taps identified in this way is variable and may be zero, as when the echo has no changing component. A switching unit selects the samples output from the taps identified by the control unit. A short-response echo canceler generates a second echo replica signal from the selected samples and subtracts the second echo replica signal from the residual signal.

According to a second aspect of the invention, the short-response echo canceler is replaced by a step-gain generator that generates step gains controlling the rate of adjustment of tap coefficients in the long-response echo canceler. The control unit controls the step-gain generator so as to increase the rate of adjustment of the tap coefficients corresponding to the selected taps.

According to a third aspect of the invention, the control unit detects whether the source of the outgoing signal is silent, and disables the short-response echo canceler when the source is not silent.

In the first and second aspects of the invention, the number of taps supplying samples to the short-response echo canceler, or the number of tap coefficients with high step gains, is adapted to the varying length of the changing component of the echo.

When the echo has no changing component, the short-response echo canceler does not operate, so power is conserved.

These features also prevent degradation of the outgoing signal due to unnecessary echo cancellation by the short-response echo canceler.

The third aspect of the invention prevents degradation of the outgoing signal due to inaccurate operation of the short-response echo canceler in the double-talk state.

DETAILED DESCRIPTION OF THE INVENTION

Figure 1:
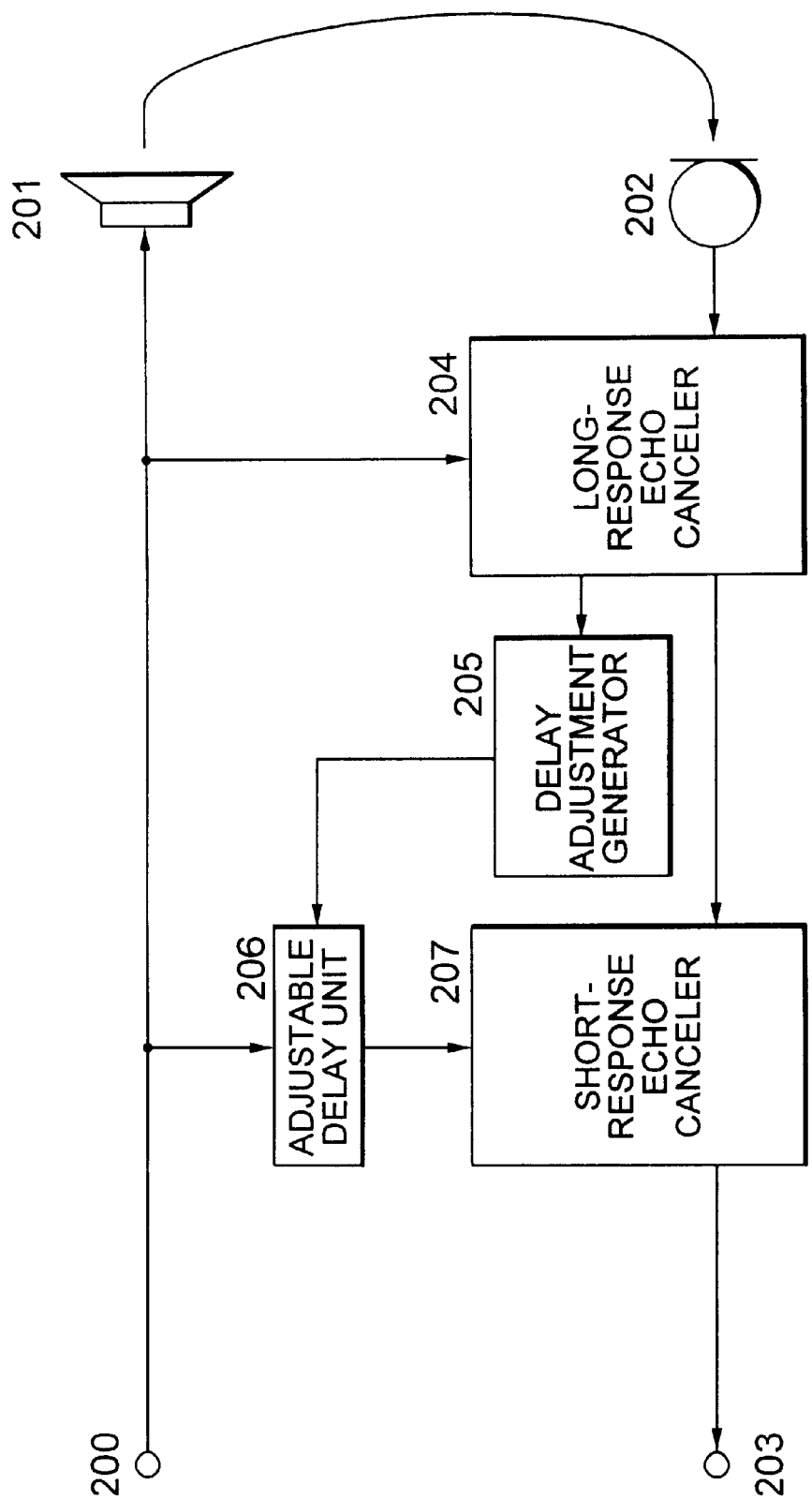
FIG. 1 is a block diagram of an echo canceling apparatus illustrating the prior art.

Embodiments of the invention will be described with reference to the attached drawings, in which like parts are indicated by like reference characters. The first embodiment will be described with reference to FIGS. 2, 3, and 4.

Figure 2:
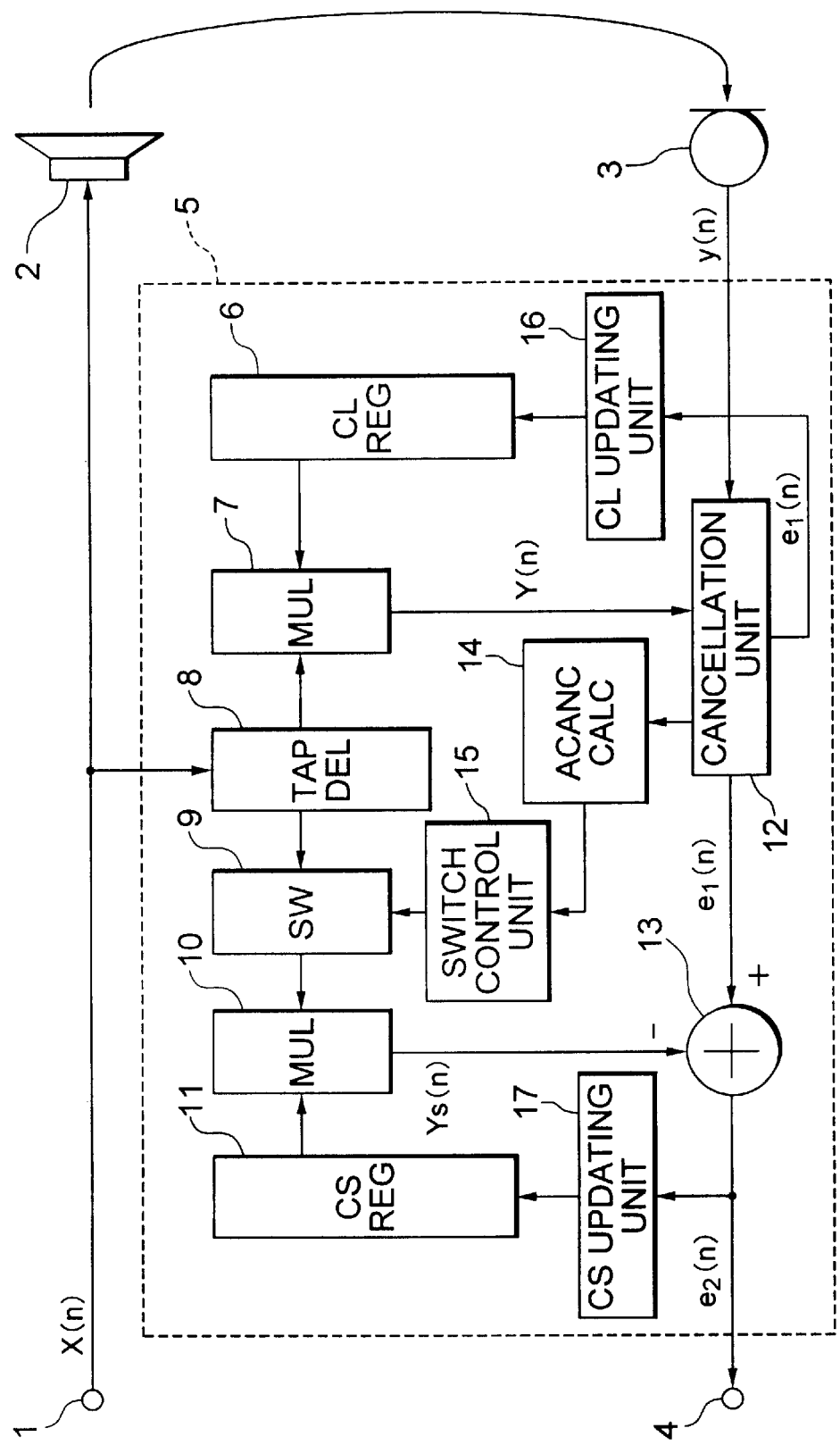
FIG. 2 is a block diagram of an echo canceling apparatus illustrating a first embodiment of the present invention.

The main elements in FIG. 2 are an input terminal 1, a loudspeaker 2, a microphone 3, an output terminal 4, and the echo canceling apparatus 5. The echo canceling apparatus 5 comprises a long-response coefficient register (CL REG) 6, a multiplication unit (MUL) 7, a tapped delay unit (TAP DEL) 8, a switching unit (SW) 9, another multiplication unit 10, a short-response coefficient register (CS REG) 11, a cancellation unit 12, another cancellation unit 13, a tap-by-tap cancellation calculator (ACANC CALC) 14, a switch control unit 15, and a pair of coefficient updating units 16, 17.

An incoming signal X(n) is supplied from the input terminal 1 to the loudspeaker 2 and tapped delay unit 8. The loudspeaker 2 converts X(n) to an acoustic signal, an echo of which is picked up by the microphone 3. The electrical signal y(n) output by the microphone 3 is supplied to the first cancellation unit 12, which subtracts a first echo replica signal Y(n) supplied by the multiplication unit 7. The resulting first residual signal or error signal $e_1(n)$ is supplied to the second cancellation unit 13 and the long-response coefficient (CL) updating unit 16. Cancellation unit 13 removes a second echo replica signal Ys(n), supplied by the multiplication unit 10, from the first residual signal $e_1(n)$. The resulting second residual signal or error signal $e_2(n)$ is supplied to the output terminal 4 and the short-response coefficient (CS) updating unit 17.

All of the electrical signals indicated in FIG. 2 are digital signals. A digital-to-analog converter (not visible) converts X(n) to an analog signal for input to the loudspeaker 2. An analog-to-digital converter (not visible) converts the analog output of the microphone 3 to the digital signal y(n). The letter n is a discrete time variable indicating sampling periods.

The first embodiment is employed, for example, in a hands-free telephone set installed in an automobile. The echo in this case is created by reflection from interior surfaces of the automobile cabin, and from the bodies of the driver and passengers. When the driver or a passenger speaks, the microphone also picks up the voice of the speaker, who will be referred to below as the near-end party. This near-end voice signal is not removed by the cancellation units 12, 13. The second residual signal $e_2(n)$ is sent over a communication link (not visible) to a far-end party with whom the near-end party converses. The incoming signal X(n) is received from the far-end party through the same communication link. The microphone output signal y(n) and the residual signals $e_1(n)$, $e_2(n)$ will be referred to collectively as the outgoing signal.

Figure 3:
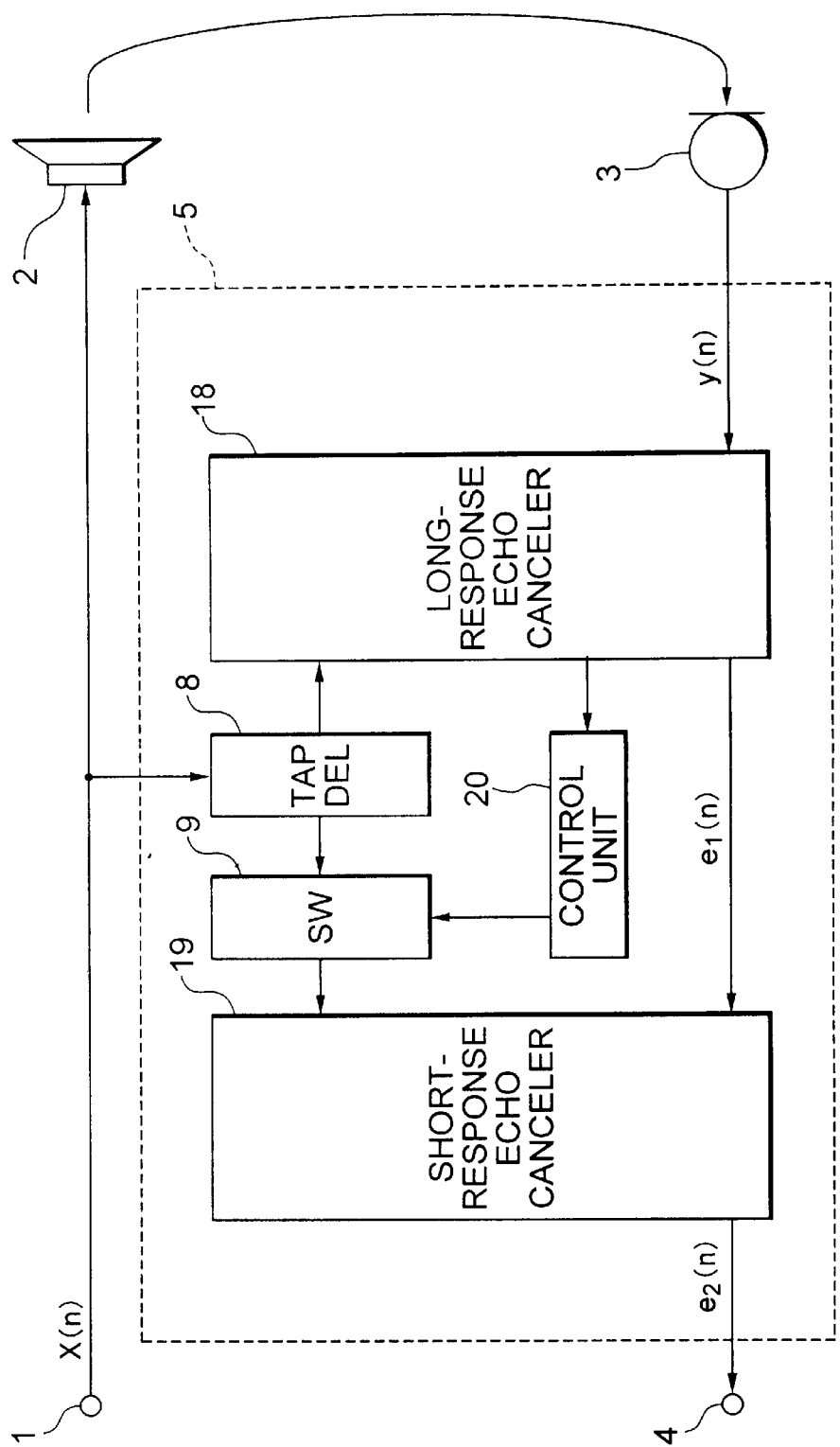
FIG. 3 is a simplified block diagram of the echo canceling apparatus in FIG. 2.

FIG. 3 is a redrawing of FIG. 2 in a simplified form. The long-response echo canceler 18 comprises the long-response coefficient register 6, multiplication unit 7, cancellation unit 12, and long-response coefficient updating unit 16 in FIG. 2. The short-response echo canceler 19 comprises the multiplication unit 10, short-response coefficient register 11, cancellation unit 13, and short-response coefficient updating unit 17. The control unit 20 comprises the tap-by-tap cancellation calculator 14 and switch control unit 15.

The tapped delay unit 8 stores a certain number of most recent samples of the incoming signal X(n). By operating on all of the stored samples, the long-response echo canceler 18 removes an echo component from the microphone output signal y(n), leaving the first residual signal $e_1(n)$. The switching unit 9 selects a subset of the samples stored in the tapped delay unit 8. By operating on this subset of samples, the short-response echo canceler 19 removes a further echo component from the first residual signal $e_1(n)$, leaving the second residual signal $e_2(n)$. The control unit 20 controls the switching unit 9 on the basis of information received from the long-response echo canceler 18.

Figure 4:
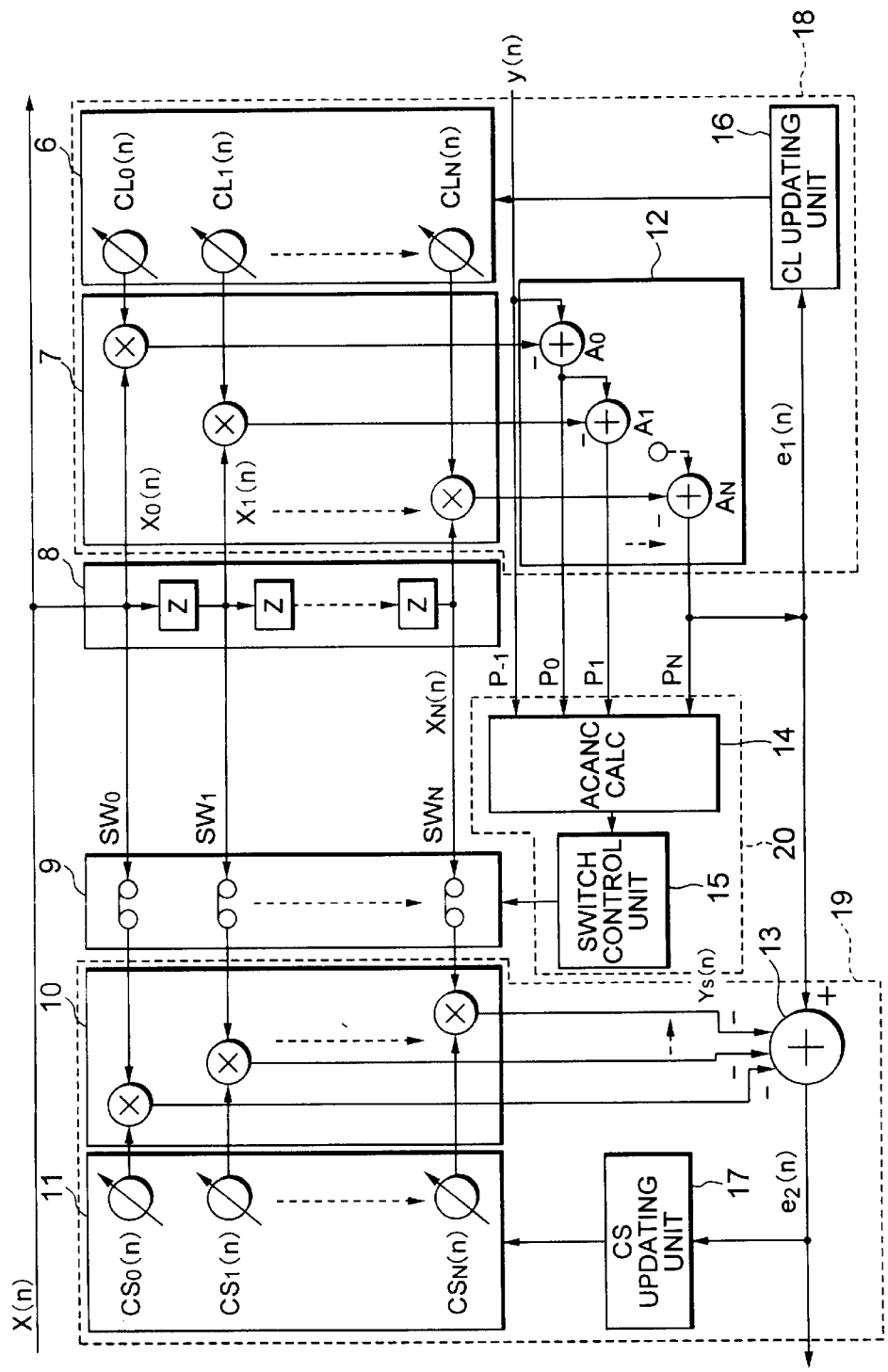
FIG. 4 is a more detailed block diagram of the echo canceling apparatus in FIG. 2.

FIG. 4 is a more detailed drawing of the echo canceling apparatus 5 in FIG. 2, showing the internal structure of several of the elements.

The tapped delay unit 8 is, for example, a shift register or ring buffer in which the incoming signal X(n) is delayed by successive intervals of one sampling period. These delays are represented by the letter Z. $X_0(n)$ denotes the undelayed incoming signal, $X_1(n)$ denotes the incoming signal delayed by one sampling period, and $X_N(n)$ denotes the incoming signal delayed by N sampling periods, where N is a positive integer. $X_j(n)$ is the same as X(n−j). The total number of sample values $X_j(n)$ supplied from the tapped delay unit 8 is N+1 (j=0, 1, . . . , N). The points from which these values $X_j(n)$ are output, indicated by dots in the drawing, are referred to as taps.

The switching unit 9 comprises N+1 switching elements, denoted $SW_0$ to $SW_N$, coupled to the taps of the tapped delay unit 8. When closed, switching element $SW_j$ supplies sample value $X_j(n)$ to multiplication unit 10 (j=0, 1, . . . , N). When open, a switching element supplies no value to the multiplication unit 10.

Multiplication unit 7 comprises N+1 multipliers that multiply sample values $X_0(n)$ to $X_N(n)$ by respective tap coefficients $CL_0$ to $CL_N$, which are supplied from the long-response coefficient register 6. Multiplication unit 10 comprises N+1 multipliers that multiply those of the sample values $X_0(n)$ to $X_N(n)$ selected by the switching unit 9 by respective tap coefficients $CS_0$ to $CS_N$, which are supplied from the short-response coefficient register 11.

The long-response coefficient register 6 and short-response coefficient register 11 are memory devices such as register files that store the tap coefficients $CL_0$ to $CL_N$ and $CS_0$ to $CS_N$, respectively.

Cancellation unit 12 comprises N+1 subtractors $A_0$ to $A_N$, coupled in series, subtracting the products output by the multipliers in the multiplication unit 7 from the outgoing signal, one after another. The output of subtractor $A_j$ is denoted $P_j$ (j=0, 1, . . . , N). The input of subtractor $A_j$ is $P_{j-1}$. $P_{-1}$ is the microphone output signal y(n), and $P_N$ is the first residual signal $e_1(n)$.

Cancellation unit 13 subtracts the outputs of the multipliers in multiplication unit 10 from the first residual signal $e_1(n)$ to obtain the second residual signal $e_2(n)$. When a switching element in the switching unit 9 is open, the corresponding multiplier in multiplication unit 10 is disabled, so there is no corresponding output to subtract. Alternatively, the output is cleared to zero. The symbol Ys(n) denotes the sum of all the outputs obtained from multiplication unit 10 in the n-th sampling period; cancellation unit 13 subtracts Ys(n) from $e_1(n)$. Internally, cancellation unit 13 may be configured as a series of N+1 subtractors, similar to cancellation unit 12.

The tap-by-tap cancellation calculator 14 compares the input and output of each of the subtractors in cancellation unit 12 to determine the amount of echo removed by each tap coefficient in the long-response coefficient register 6, and supplies time-averaged values of these amounts to the switch control unit 15. Details will be given later.

The switch control unit 15 monitors the values supplied by the tap-by-tap cancellation calculator 14 to detect abrupt changes, more specifically abrupt increases. The switch control unit 15 opens and closes the switching elements in the switching unit 9 according to the detection results. Details will be given later.

The long-response coefficient updating unit 16 adjusts the tap coefficients $CL_0$ to $CL_N$ so as to minimize the magnitude or power of the first residual signal $e_1(n)$ when the near-end party is not speaking. The long-response coefficient updating unit 16 employs an algorithm that causes the tap coefficients $CL_0$ to $CL_N$ to converge to the impulse response of the echo path from the loudspeaker 2 to the microphone 3. Known examples of such algorithms include the normalized least mean squares (NLMS) algorithm and the recursive least squares (RLS) algorithm. Any of these and other known algorithms may be employed.

The short-response coefficient updating unit 17 adjusts the tap coefficients $CS_0$ to $CS_N$ so as to minimize the magnitude or power of the second residual signal $e_2(n)$ when the near-end party is not speaking, employing a similar algorithm. One property of the algorithms employed by the coefficient updating units 16, 17 is that the fewer tap coefficients there are, the faster they tend to converge.

Next, the operation of the first embodiment will be described. At the beginning of the operation, all of the switching elements in the switching unit 9 are open, and the short-response echo canceler 19 does not operate.

As samples of the incoming signal X(n) are received at the input terminal 1, they are stored in the tapped delay unit 8. The tapped delay unit 8 stores the N most recent past samples. For example, when X(10) is received in the tenth sampling period (n=10), the tapped delay unit 8 stores the most recent preceding sample X(9) as $X_1(10)$, the next most recent preceding sample X(8) as $X_2(10)$, and so on.

The incoming signal is reproduced acoustically by the loudspeaker 2, and an echo is picked up by the microphone 3. At times when the far-end party is speaking and the near-end party is silent, the microphone output signal y(n) consists almost entirely of echo.

The multiplication unit 7 and cancellation unit 12 convolve the incoming signal with the tap coefficients stored in the long-response coefficient register 6 to obtain the first echo replica signal Y(n), and subtract Y(n) from the outgoing signal y(n). These operations are described by the following equations, where the summation in the first equation is from i=0 to i=N.

$$Y(n)=\Sigma CL_i(n) \cdot X_i(n)$$

$$e_1(n)=y(n)-Y(n)$$

In the course of these calculations, cancellation unit 12 obtains the values $P_0$ to $P_N$ noted above, representing the outgoing signal after subtraction of successive portions of the first echo replica signal Y(n). $P_N$ is the residual signal $e_1(n)$ left after the entire first echo replica Y(n) has been subtracted.

The tap-by-tap cancellation calculator 14 determines the amount of echo canceled by each subtractor in the tap-by-tap cancellation calculator 14 by performing, for example, the following calculation. $ACANC_j(n)$ is the amount of echo canceled by subtractor $A_j$ (j=0, 1, . . . , N). $P_{j-1}(n)$ and $P_j(n)$ are the input and output, respectively, of the j-th subtractor $A_j$ during the n-th sampling period.

$$ACANC_j(n)=|P_j(n)-P_{j-1}(n)|$$

This calculation makes $ACANC_j(n)$ equal to the absolute value of the product $CL_j(n) \cdot X_j(n)$ output by the j-th multiplier in multiplication unit 7. $ACANC_j(n)$ represents the cancellation produced by processing of the sample $X_j(n)$ output from the j-th tap of the tapped delay unit 8.

The first embodiment is not limited to this method of calculating $ACANC_j(n)$. An alternative method is to calculate $ACANC_j(n)$ as a decibel power ratio described, for example, by the following equation.

$$ACANC_j(n)=20 \log |P_j(n)/P_{j-1}(n)|$$

The tap-by-tap cancellation calculator 14 averages these cancellation values $ACANC_j(n)$ over time (n) by performing the following calculation, in which δ is a time constant between zero and one (0<δ<1).

$$L\_ACANC_j(n)=\delta \cdot ACANC_j(n)+(1-\delta)\cdot L\_ACANC_j(n-1)$$

The time constant δ is also referred to as a memory factor, since it represents the rate at which the tap-by-tap cancellation calculator 14 'forgets' the previous cancellation values. The time average $L\_ACANC_j(n)$ tracks short-term changes in $ACANC_j(n)$ if δ is large, and long-term changes in $ACANC_j(n)$ if δ is small. The value of δ is a design choice. The initial time average $L\_ACANC_j(0)$ is set equal to zero.

The tap-by-tap cancellation calculator 14 supplies the time averages $L\_ACANC_j(n)$ to the switch control unit 15. The switch control unit 15 detects abrupt increases in the time averages by comparing $L\_ACANC_j(n)$ with a threshold value TH equal to, for example, twice the preceding time average $L\_ACANC_j(n-1)$. Upon detecting an abrupt increase in $L\_ACANC_j(n)$, the switch control unit 15 closes the j-th switching element in the switching unit 9.

When a time average $L\_ACANC_j(n)$ remains consistently below its threshold TH, this indicates that the corresponding part of the impulse response of the echo path (the part represented by tap coefficient $CL_j$) is not undergoing rapid change. Conversely, when there is an abrupt change in the acoustic echo path, markedly altering part of the impulse response, the time averages corresponding to the altered part of the impulse response can be expected to change abruptly, as the long-response coefficient updating unit 16 makes large alterations in the relevant tap coefficients $CL_j(n)$.

The switch control unit 15 detects these changes while the long-response coefficient updating unit 16 is still in the process of adjusting the tap coefficients to adapt to the altered impulse response. The adjustment process takes time, because there are many tap coefficients, and they do not converge directly toward the correct new values.

When one or more of the switching elements in the switching unit 9 have been closed, the short-response echo canceler 19 begins receiving selected sample values from the tapped delay unit 8, and generates a second echo replica signal Ys(n) on the basis of the selected sample values. Specifically, the multiplication unit 10 and cancellation unit 13 convolve the selected sample values with the tap coefficients stored in the short-response coefficient register 11, performing the following operation, where the summation is over the values of i for which the i-th switching element in the switching unit 9 is closed.

$$Ys(n)=\Sigma CS_i(n)\cdot X_i(n)$$

For example, if the tenth to thirtieth switching elements in the switching unit 9 are currently closed and the other switching elements are open, the summation is carried out from i=10 to i=30.

Cancellation unit 13 subtracts the second echo replica signal Ys(n) from the first residual signal $e_1(n)$ to obtain the second residual signal $e_2(n)$, performing the following operation.

$$e_2(n)=e_1(n)-Ys(n)$$

The short-response coefficient updating unit 17 adjusts the tap coefficients $CS_i(n)$ corresponding to closed switching elements in the switching unit 9. This adjustment process proceeds more quickly than the adjustment process in the long-response echo canceler 18, because not all of the switching elements are closed, so there are fewer tap coefficients to adjust.

After closing the j-th switching element in the switching unit 9, the switch control unit 15 continues to monitor the j-th time average $L\_ACANC_j(n)$. If the switch control unit 15 detects, from a lack of change in $L\_ACANC_j(n)$, that the j-th tap coefficient $CL_j(n)$ in the long-response coefficient register 6 has converged, it opens the j-th switching element in the switching unit 9.

At any given time, the closed switching elements in the switching unit 9 tend to correspond to the most dynamically changing part of the impulse response of the echo path, where 'dynamically' includes both the speed and magnitude of the change. The second echo replica signal Ys(n) thus corresponds to the most-changing echo component. This is the echo component that the long-response echo canceler 18 is least able to cancel successfully, because of the comparatively slow convergence of its tap coefficients. The short-response echo canceler 19 is better suited to cancel this echo component, because it updates only some of its tap coefficients at a time, enabling these coefficients to converge more quickly. In combination, the two echo cancelers 18, 19 cancel more of the echo than could be canceled by either echo canceler alone.

Compared with the prior art, one advantage of the first embodiment is that the length of the second echo replica signal Ys(n), that is, the number of closed switching elements in the switching unit 9, is automatically adjusted to the length of the dynamically changing echo component, so that the second echo replica signal is neither too short nor too long.

If the dynamically changing echo component is very short, then only a few switching elements in the switching unit 9 will be open, the short-response coefficient updating unit 17 will have only a few tap coefficients to update, and these tap coefficients will converge very quickly. The short-response echo canceler 19 will then be able to cancel the dynamically changing echo component fairly accurately.

If the dynamically changing echo component is longer, the short-response coefficient updating unit 17 will have more tap coefficients to update, convergence will be slower, and cancellation will be less accurate, but the short-response echo canceler 19 will still cancel the entire dynamically changing echo component to at least some extent, and not miss any part of this component because of restricted tap length, as would happen in the prior art.

Another advantage of the first embodiment is that when the echo has no dynamically changing component, all switching elements in the switching unit 9 are open, so the short-response echo canceler 19 does not operate and does not consume power. Degradation of the outgoing signal $e_2(n)$ by inaccurate operation of the short-response echo canceler 19 in this state, in response to minor changes in the echo path, is also avoided.

Yet another advantage is that the second echo replica signal Ys(n) is accurately positioned on the dynamically changing echo component, instead of being arbitrarily centered on a particular tap coefficient in the long-response echo canceler 18. The second echo replica is thus positioned correctly regardless of whether the actual shape of the dynamically changing echo component is symmetrical or skewed.

In a variation of the first embodiment, the switching unit 9 is disposed between multiplication unit 10 and short-response coefficient register 11, or between multiplication unit 10 and cancellation unit 13. In these positions, the switching unit 9 still selects the sample values $X_j(n)$ from which the second echo replica signal Ys(n) is generated, and similar results are obtained. This variation also applies to the succeeding embodiments.

Next a second embodiment will be described.

Figure 5:
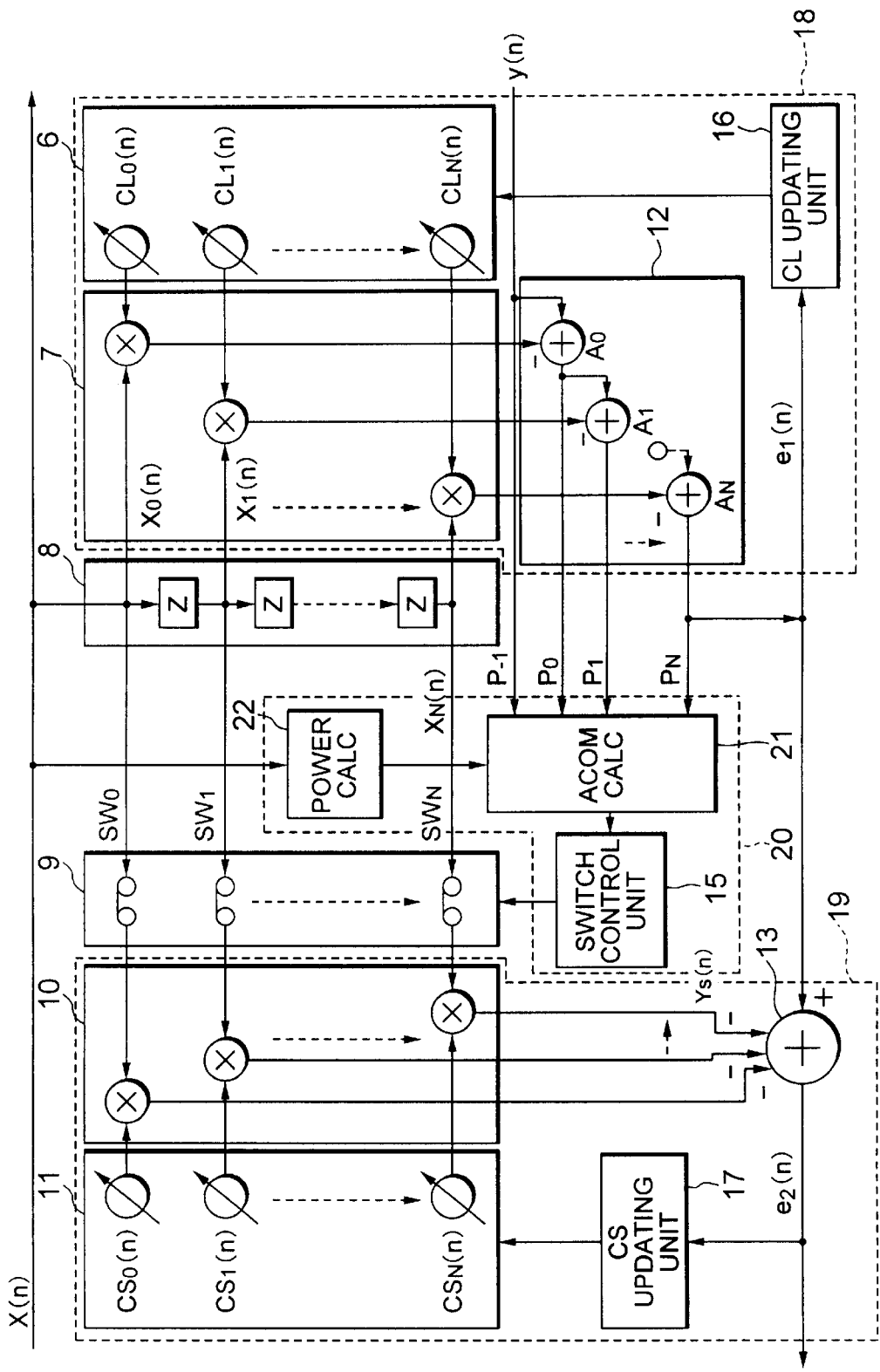
FIG. 5 is a block diagram of an echo canceling apparatus illustrating a second embodiment of the invention.

Referring to FIG. 5, the second embodiment employs the same long-response echo canceler 18 and short-response echo canceler 19 as the first embodiment. In the control unit 20, the second embodiment replaces the tap-by-tap cancellation calculator 14 of the first embodiment with a tap-by-tap attenuation calculator (ACOM CALC) 21, and adds a power calculator 22. The power calculator 22 receives the incoming signal X(n) and calculates a value L__X(n) approximating the power level of the incoming signal. The tap-by-tap attenuation calculator 21 compares L__X(n) with a similarly calculated approximation to the power level of each of the signals $P_0$ to $P_N$ output from cancellation unit 12, and supplies averaged results of these comparisons to the switch control unit 15. The switch control unit 15 operates as in the first embodiment, using the results supplied by the tap-by-tap attenuation calculator 21 in place of the time averages described in the first embodiment.

The operation of the control unit 20 in the second embodiment will now be described in more detail.

The power calculator 22 calculates L__X(n) as a time-averaged absolute value of the incoming signal X(n), according to the following equation, in which $\delta_1$ is a time constant or memory factor between zero and one.

$$L\_X(n) = \delta_1 \cdot |X(n)| + (1-\delta_1) \cdot L\_X(n-1)$$

The calculated level L__X(n) tracks short-term changes in X(n) if $\delta_1$ is large, and long-term changes in X(n) if $\delta_1$ is small. The value of $\delta_1$ is a design choice. The initial value L__X(0) is set equal to zero.

The tap-by-tap attenuation calculator 21 calculates the approximate power level $L\_P_j(n)$ of $P_j$ at time n as a similar time average, according to the following equation. The initial value $L\_P_j(0)$ is zero.

$$L\_P_j(n) = \delta_1 \cdot |P_j(n)| + (1-\delta_1) \cdot L\_P_j(n-1)$$

The tap-by-tap attenuation calculator 21 then calculates the echo attenuation $ACOM_j(n)$ due to the j-th tap coefficient $CL_j(n)$ by comparing $L\_P_j(n)$ with L__X(n). $ACOM_j(n)$ is calculated as a decibel power ratio, for example, as follows.

$$ACOM_j(n) = 20 \log \{L\_X(n)/L\_P_j(n)\}$$

Alternatively, $ACOM_j(n)$ can be calculated by a subtraction operation, for example, as follows.

$$ACOM_j(n) = L\_X(n) - L\_P_j(n)$$

The tap-by-tap attenuation calculator 21 now calculates a time-averaged attenuation value $L\_ACOM_j(n)$ according to the following equation. The initial value $L\_ACOM_j(0)$ is set equal to zero.

$$L\_ACOM_j(n) = \delta \cdot ACOM_j(n) + (1-\delta) \cdot L\_ACOM_j(n-1)$$

These calculations are performed for j=0, 1, . . . , N, and the time averages $L\_ACOM_j(n)$ are supplied to the switch control unit 15. The switch control unit 15 compares each time-averaged attenuation value L $ACOM_j(n)$ with a threshold TH2 set equal to, for example, twice the preceding time average $L\_ACOM_j(n-1)$, and closes the j-th switching element in the switching unit 9 if $L\_ACOM_j(n)$ exceeds TH2. In other words, the switch control unit 15 closes a switching element when it detects an abrupt change, more specifically an abrupt increase, in the corresponding time-averaged attenuation value.

The switch control unit 15 also opens switching elements in the switching unit 9, when the corresponding time-averaged attenuation values are observed to be no longer changing.

The two echo cancelers 18, 19 operate as in the first embodiment.

The effects of the second embodiment are similar to the effects of the first embodiment in adapting the length and position of the second echo replica signal Ys(n) to the dynamically changing echo component, so that this component is properly canceled, and disabling the short-response echo canceler 19 when it is not needed, thereby saving power and avoiding degradation of the outgoing signal.

By calculating the power level of the incoming signal X(n), and using the input power level to calculate echo attenuation values as described above, the second embodiment is able to take account of changes in the incoming power level, and thereby identify the changing parts of the impulse response of the echo path more accurately than in the first embodiment.

Next a third embodiment will be described.

Figure 6:
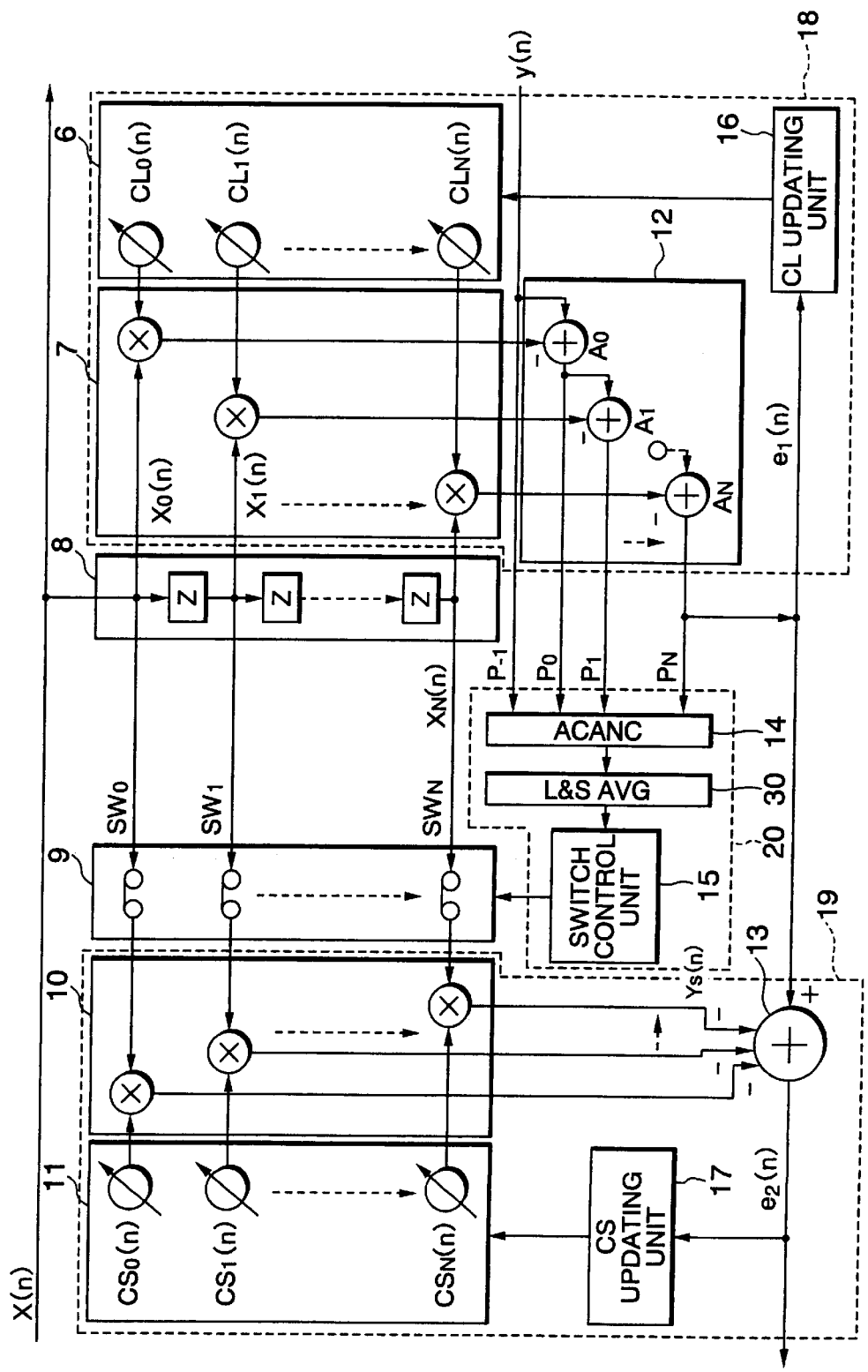
FIG. 6 is a block diagram of an echo canceling apparatus illustrating a third embodiment.

Referring to FIG. 6, the third embodiment employs the same long-response echo canceler 18 and short-response echo canceler 19 as the first embodiment. In the control unit 20, the third embodiment inserts a long and short cancellation averaging unit (L & S AVG) 30 between the tap-by-tap cancellation calculator 14 and switch control unit 15, and modifies the operation of the tap-by-tap cancellation calculator 14 and switch control unit 15 accordingly.

The control unit 20 in the third embodiment operates as follows.

The tap-by-tap cancellation calculator 14 calculates the echo cancellation values $ACANC_j(n)$ (j=0, 1, 2, . . . , N) described in the first embodiment, and supplies the calculated values to the long and short cancellation averaging unit 30.

For each value of j from zero to N, the long and short cancellation averaging unit 30 uses a long-duration time constant $\delta_L$ and a short-duration time constant $\delta_S$ to calculate a long-term average cancellation $L\_ACANC_j(n)$, and a short-term average cancellation $S\_ACANC_j(n)$, according to the following equations.

$$L\_ACANC_j(n) = \delta_L \cdot ACANC_j(n) + (1-\delta_L) \cdot L\_ACANC_j(n-1)$$

$$S\_ACANC_j(n) = \delta_S \cdot ACANC_j(n) + (1-\delta_S) \cdot S\_ACANC_j(n-1)$$

The short-duration time constant $\delta_S$ is greater than the long-duration time constant $\delta_L$ ($\delta_L < \delta_s$), so the short-term average $S\_ACANC_j(n)$ tracks relatively short-term changes in $ACANC_j(n)$, while the long-term average $L\_ACANC_j(n)$ tracks relatively long-term changes in $ACANC_j(n)$. The long and short cancellation averaging unit 30 supplies the calculated averages $S\_ACANC_j(n)$ and $L\_ACANC_j(n)$ to the switch control unit 15.

The switch control unit 15 tests the following relationship, in which THCH is a positive threshold value equivalent to, for example, six decibels.

$$L\_ACANC_j(n) - THCH \leq S\_ACANC_j(n) \leq L\_ACANC_j(n) + THCH$$

The switch control unit 15 opens the j-th switching element in the switching unit 9 when this relationship is satisfied, and closes the j-th switching element if this relationship is not satisfied. The j-th switching element is accordingly closed in either of the following cases.

$$S\_ACANC_j(n) > L\_ACANC_j(n) + THCH$$

$$S\_ACANC_j(n) > L\_ACANC_j(n) - THCH$$

When the j-th tap coefficient $CL_j(n)$ in the long-response coefficient register 6 is in a converged state, the j-th cancellation value ACANC$_j$(n) tends to remain comparatively stable, so the short-term average S_ACANC$_j$(n) remains within THCH of the long-term average L_ACANC$_j$(n), and the j-th switching element in the switching unit 9 remains open. When CL$_j$(n) is not in a converged state, ACANC$_j$(n) tends to fluctuate, causing the short-term average S_ACANC$_j$(n) to differ from the long-term average L_ACANC$_j$(n) by more than THCH, thus causing the switch control unit 15 to close the j-th switching element in the switching unit 9.

The two echo cancelers 18, 19 operate as in the first embodiment.

The effects of the third embodiment are similar to the effects of the first embodiment in adapting the length and position of the second echo replica signal Ys(n) correctly and disabling the operation of the short-response echo canceler 19 when it is not needed.

By calculating the time-averaged cancellation value of each tap with two different time constants, and testing the difference between the two time averages, the third embodiment is able to identify the dynamically changing parts of the impulse response of the echo path more accurately and more quickly than in the first embodiment. When the echo path changes, accordingly, the short-response echo canceler 19 begins to take compensatory echo-canceling action more promptly and more effectively than in the first embodiment.

In a variation of the third embodiment, after closing a switching element, the switch control unit 15 waits until the difference between the short-term and long-term averages remains within the threshold THCH for a certain time before opening the switching element.

Next a fourth embodiment will be described.

Figure 7:
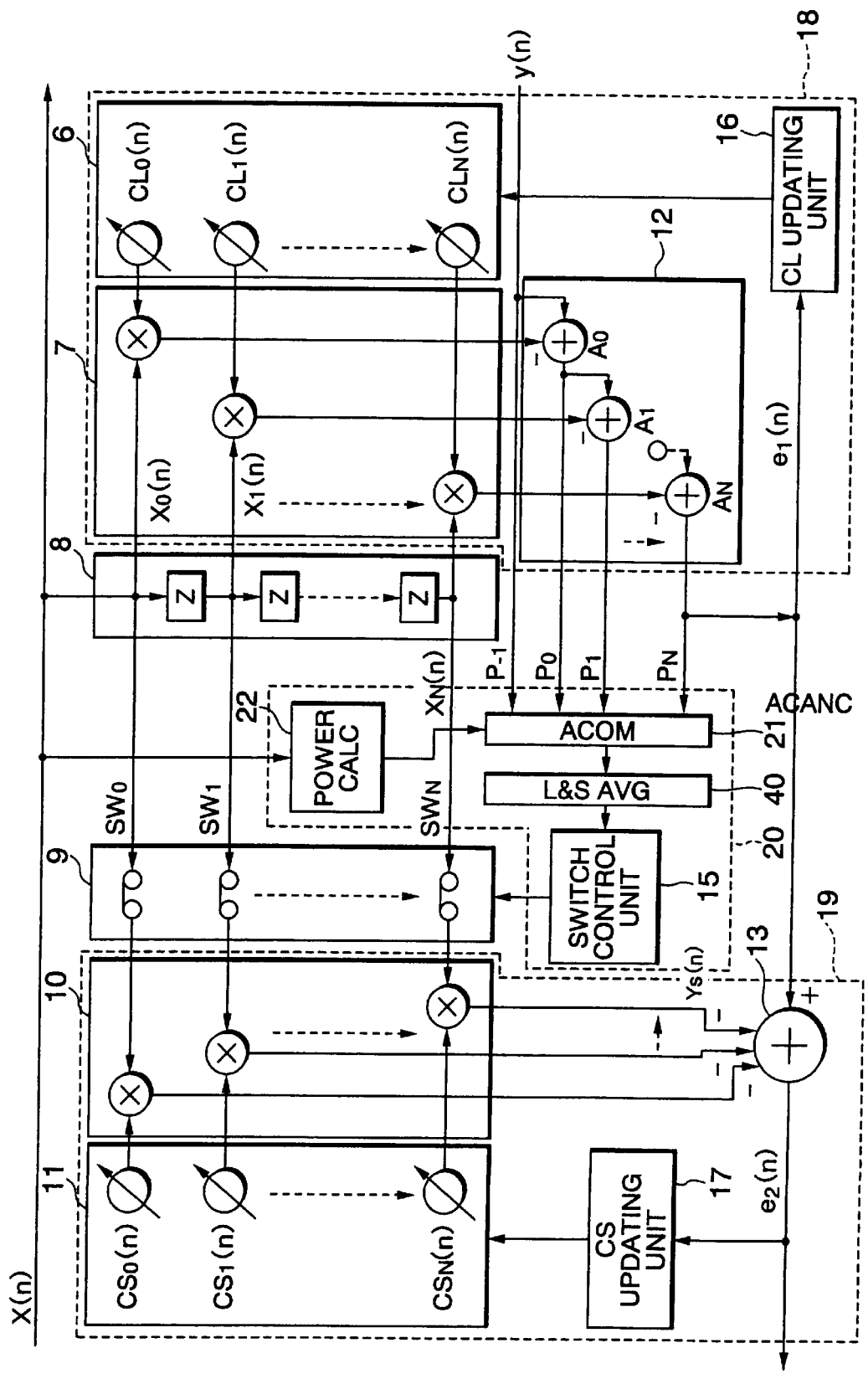
FIG. 7 is a block diagram of an echo canceling apparatus illustrating a fourth embodiment.

Referring to FIG. 7, the fourth embodiment employs the same long-response echo canceler 18 and short-response echo canceler 19 as the first embodiment. The control unit 20 is similar to the control unit of the second embodiment, including the power calculator 22, but a long and short attenuation averaging unit 40 is inserted between the tap-by-tap attenuation calculator 21 and switch control unit 15.

The control unit 20 in the fourth embodiment operates as follows.

The tap-by-tap attenuation calculator 21 calculates the echo attenuation values ACOM$_j$(n) (j=0, 1, 2, . . . , N) described in the second embodiment, and supplies the calculated values to the long and short attenuation averaging unit 40.

For each value of j from zero to N, the long and short attenuation averaging unit 40 uses a long-duration time constant $\delta_L$ and a short-duration time constant $\delta_L$ to calculate a long-term average attenuation value L_ACOM$_j$(n) and a short-term average attenuation value S_ACOM$_j$(n) as described in the third embodiment. Specifically, $$L\_ACOM_j(n)=\delta_L \cdot ACOM_j(n)+(1-\delta_L) \cdot L\_ACOM_j(n-1)$$

$$S\_ACOM_j(n)=\delta_S \cdot ACOM_j(n)+(1-\delta_S) \cdot S\_ACOM_j(n-1)$$

The long and short attenuation averaging unit 40 supplies the average attenuation values S_ACOM$_j$(n) and L_ACOM$_j$(n) to the switch control unit 15. The switch control unit 15 operates as in the third embodiment, opening and closing the j-th switching element in the switching unit 9 according to whether or not S_ACOM$_j$(n) differs from L_ACOM$_j$(n) by more than a predetermined threshold THCH.

The two echo cancelers 18, 19 operate as in the first embodiment.

The fourth embodiment provides the combined effects of all of the preceding embodiments. The length and position of the second echo replica signal Ys(n) are adapted promptly and accurately to match the length and position of the dynamically changing part of the impulse response of the echo path, the power of the incoming signal X(n) being taken into account, and the operation of the short-response echo canceler 19 is disabled when it is not needed.

Next, a fifth embodiment will be described.

Figure 8:
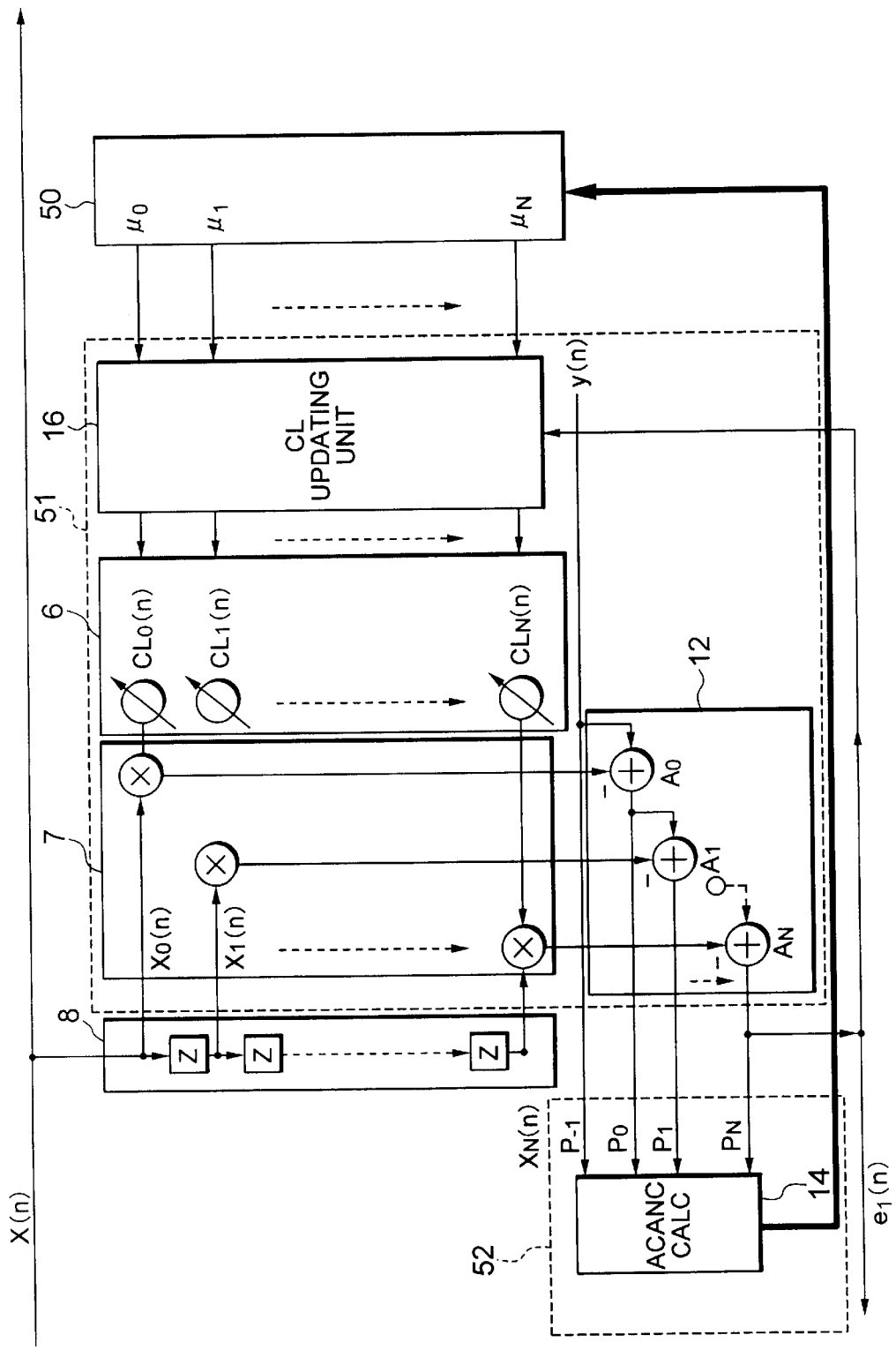
FIG. 8 is a block diagram of an echo canceling apparatus illustrating a fifth embodiment.

Referring to FIG. 8, the fifth embodiment comprises the long-response coefficient register 6, multiplication unit 7, tapped delay unit 8, cancellation unit 12, and tap-by-tap cancellation calculator 14 of the first embodiment, a slightly modified long-response coefficient updating unit 16, and a step-gain generator 50. The long-response coefficient register 6, multiplication unit 7, cancellation unit 12, and long-response coefficient updating unit 16 constitute a single echo canceler 51. The tap-by-tap cancellation calculator 14 constitutes the control unit 52 of the fifth embodiment.

The long-response coefficient updating unit 16 updates the tap coefficients CL$_j$(n) according to a modified version of the NLMS algorithm, described by the following equation, in which the summation in the rightmost term is from i=0 to i=N.

$$CL_j(n+1)=CL_j(n)+\mu_j \cdot e_1(n)X_j(n)/\Sigma X_i(n)^2$$

The quantity $\mu_j$ in this equation, referred to as the step gain, determines the rate of adjustment, hence the rate and accuracy of convergence, of the tap coefficient CL$_j$(n). Reducing the step gain makes the convergence slower but more accurate. Increasing the step gain makes the convergence faster but less accurate. The standard NLMS algorithm uses the same step gain for all tap coefficients. The fifth embodiment uses different step gains for different tap coefficients. The step gains $\mu_j$(j=0, 1, . . . , N) are supplied by the step-gain generator 50.

The multiplication unit 7, cancellation unit 12, and tap-by-tap cancellation calculator 14 operate as described in the first embodiment. For each tap coefficient CL$_j$(n), the tap-by-tap cancellation calculator 14 calculates the time-averaged cancellation L_ACANC$_j$(n) due to that tap coefficient. The tap-by-tap cancellation calculator 14 supplies the time averages L_ACANC$_j$(n) to the step-gain generator 50.

The operation of the step-gain generator 50 is analogous to the operation of the switch control unit 15 in the first embodiment. By comparing each supplied value L_ACANC$_j$(n) with a threshold TH, the step-gain generator 50 identifies the tap coefficients with time averages that increase abruptly, corresponding to dynamically changing parts of the impulse response of the echo path. To these tap coefficients, the step-gain generator 50 assigns a comparatively large step gain $\mu_L$, such as a step gain of unity ($\mu_L$=1.0). To other tap coefficients, the step-gain generator 50 assigns a smaller step gain $\mu_S$, such as a step gain of one-half ($\mu_S$=0.5)

For example, if L_ACANC$_{30}$(n) to L_ACANC$_{50}$(n) exceed the threshold TH and the other time averages L_ACANC$_j$(n) do not, the step-gain generator 50 sets $\mu_{30}$ to $\mu_{50}$ equal to $\mu_L$, and sets the other step gains $\mu_j$ equal to $\mu_S$.

Accordingly, when the impulse response of the echo path changes, the control unit 52 and step-gain generator 50 identify the dynamically changing part and assign high step gains to the corresponding tap coefficients, permitting those tap coefficients to converge rapidly, if somewhat inaccurately, toward appropriate new values. When the dynamic change ceases, the step gains revert to their original, lower values, permitting the corresponding tap coefficients to finish converging more accurately.

Like the first embodiment, the fifth embodiment deals successfully with an echo path that has both changing and unchanging components. The first embodiment provided a second, more rapidly-converging echo canceler for the changing component, adjusting the length and position of the second echo replica signal to match the length and position of the changing echo component. The fifth embodiment provides a second, higher step gain for the changing component, applying the second step gain to a tap-coefficient group with a length and position that matches the length and position of the changing echo component. The fifth embodiment thus provides effects generally similar to those of the first embodiment.

Compared with the first embodiment, however, the fifth embodiment is smaller, less complex, and less costly, and consumes less power, because it has only one echo canceler.

Next, a sixth embodiment will be described. The sixth embodiment combines the features of the second and fifth embodiments.

Figure 9:
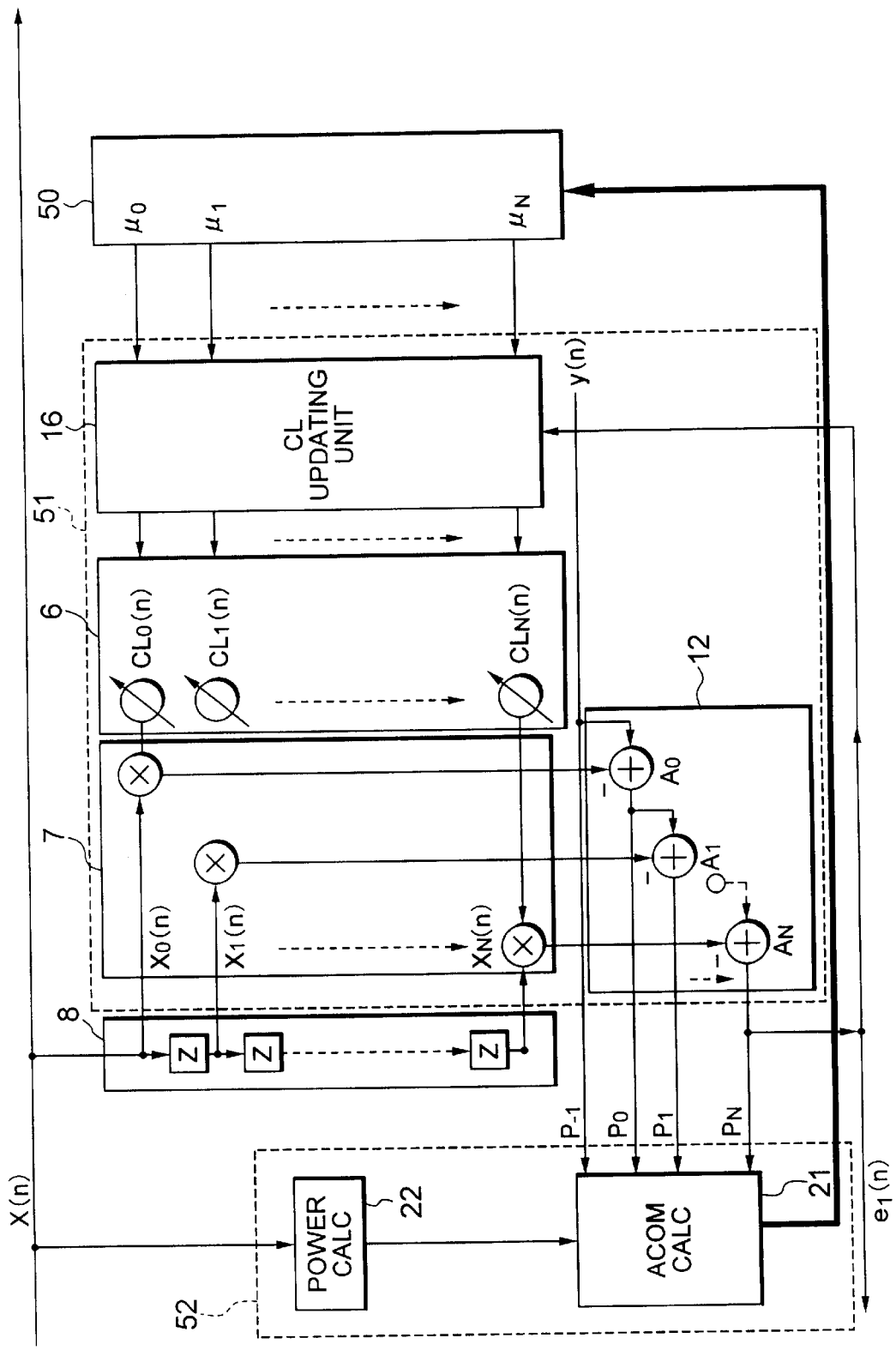
FIG. 9 is a block diagram of an echo canceling apparatus illustrating a sixth embodiment.

Referring to FIG. 9, the sixth embodiment employs the same tapped delay unit 8 and echo canceler 51 as the fifth embodiment, and essentially the same step-gain generator 50, but modifies the control unit 52. Specifically, the sixth embodiment replaces the tap-by-tap cancellation calculator of the fifth embodiment with a tap-by-tap attenuation calculator 21, and adds a power calculator 22.

The tap-by-tap attenuation calculator 21 and power calculator 22 operate as described in the second embodiment. The power calculator 22 supplies time-averaged echo attenuation values L_ACOM$_j$(n) to the step-gain generator 50.

The step-gain generator 50 compares the time-averaged echo attenuation values L_ACOM$_j$(n) with respective thresholds TH2, and operates substantially as described in the fifth embodiment, selecting a large step gain $\mu_L$ for the j-th tap coefficient CL$_j$(n) when L_ACOM$_j$(n) exceeds TH2, and a small step gain $\mu_S$ when L_ACOM$_j$(n) does not exceed TH2.

The sixth embodiment provides the combined effects of the second and fifth embodiments, including more accurate identification of the changing part of the impulse response of the echo path, together with reduced size, complexity, cost, and power consumption.

Next, a seventh embodiment will be described. The seventh embodiment combines the features of the third and fifth embodiments.

Figure 10:
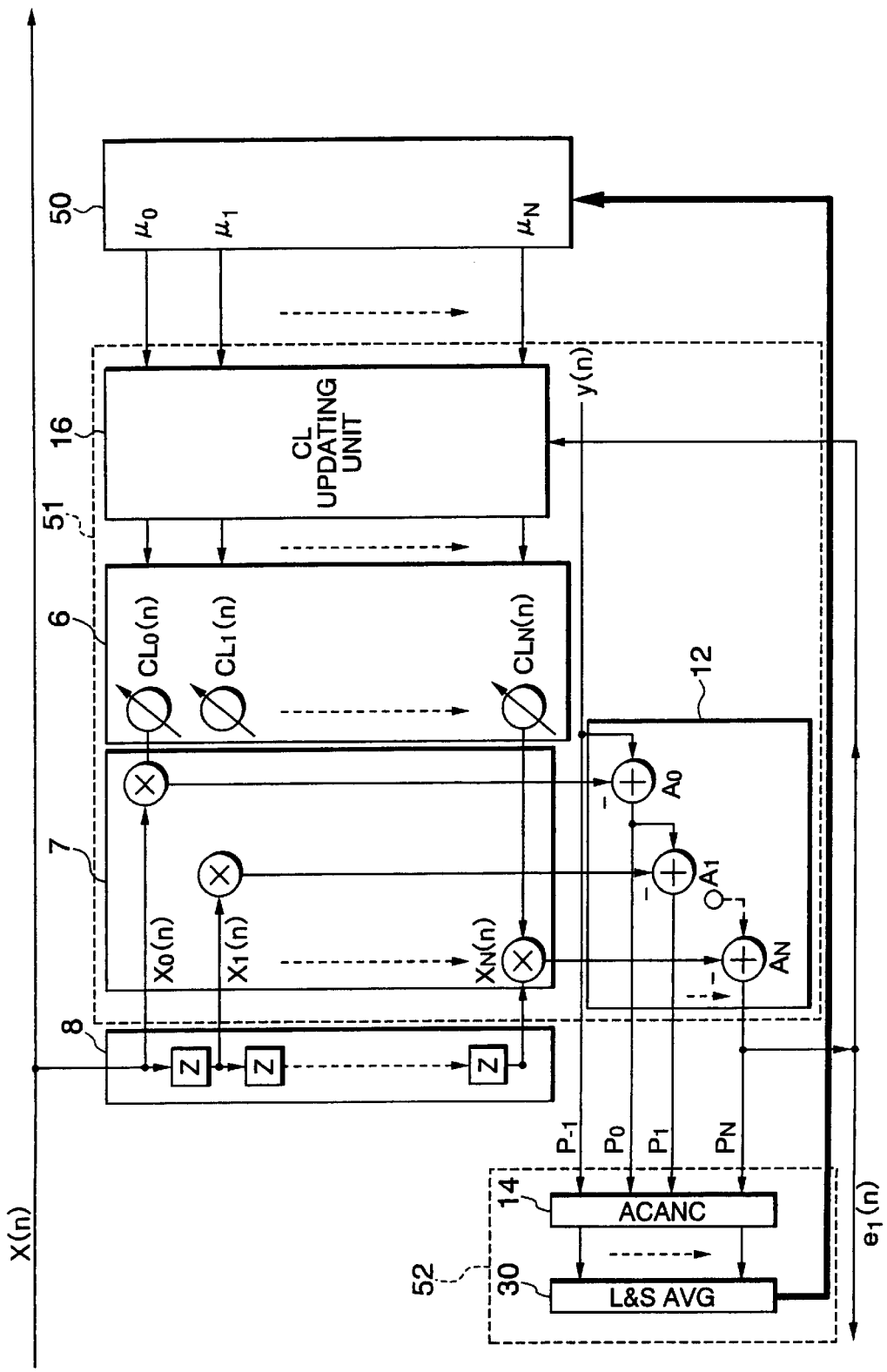
FIG. 10 is a block diagram of an echo canceling apparatus illustrating a seventh embodiment.

Referring to FIG. 10, the seventh embodiment modifies the control unit 52 of the fifth embodiment by inserting a long and short cancellation averaging unit 30 between the tap-by-tap cancellation calculator 14 and step-gain generator 50, and modifies the operation of the step-gain generator 50. The tap-by-tap cancellation calculator 14 and long and short cancellation averaging unit 30 operate as described in the third embodiment. The long and short cancellation averaging unit 30 uses different time constants to calculate long-term and short-term time averages L_ACANC$_j$(n) and S_ACANC$_j$(n), which are supplied to the step-gain generator 50. The step-gain generator 50 determines whether S_ACANC$_j$(n) is within a threshold THCH of L_ACANC$_j$(n), and sets the step gain $\mu_j$ to a large value $\mu_L$ or a small value $\mu_S$ accordingly.

The seventh embodiment provides the combined effects of the third and fifth embodiments, including quick identification of the changing part of the impulse response of the echo path, and reduced size, complexity, cost, and power consumption.

Next, an eighth embodiment will be described. The eighth embodiment combines the features of the fourth and fifth embodiments.

Figure 11:
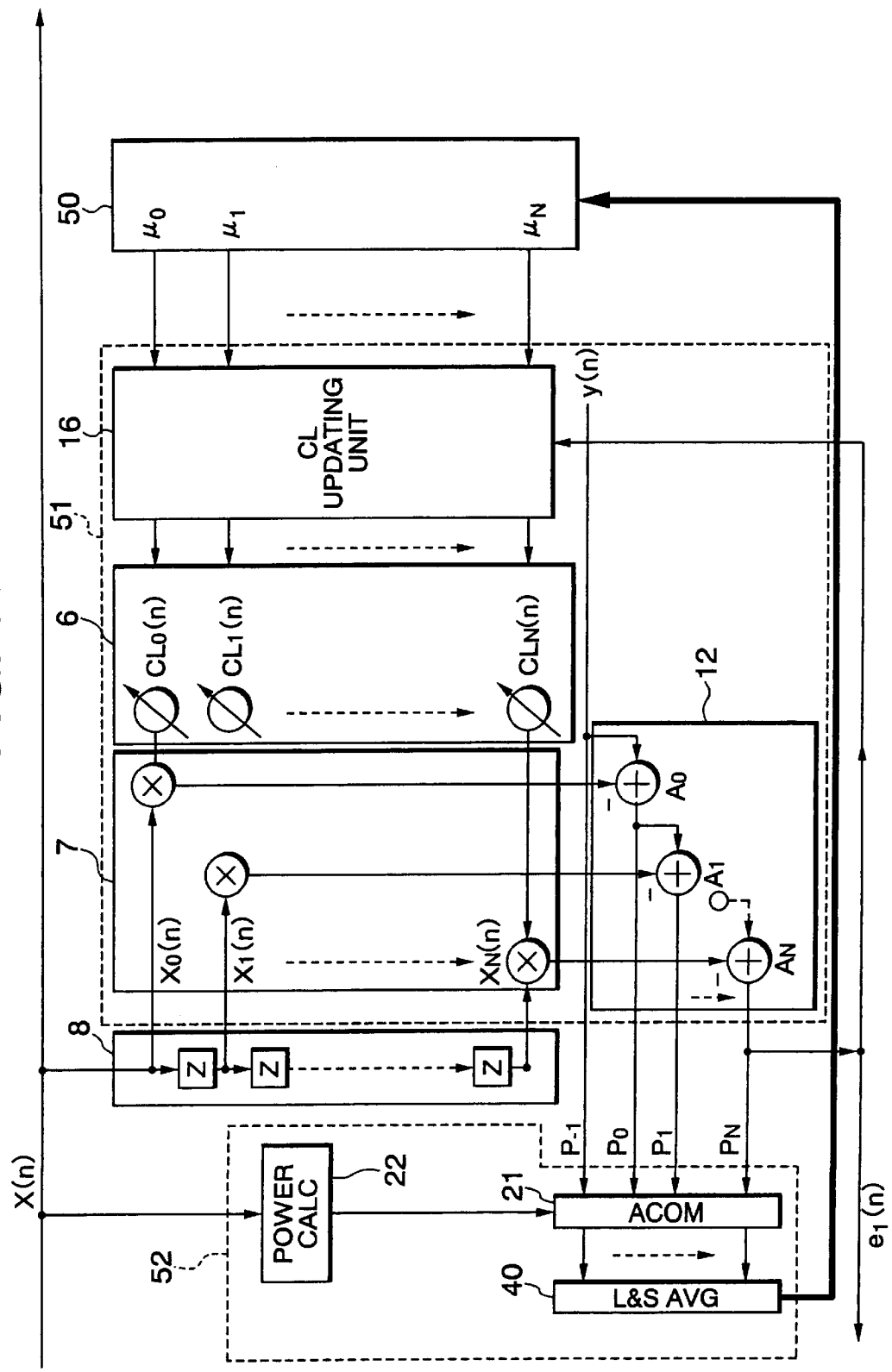
FIG. 11 is a block diagram of an echo canceling apparatus illustrating an eighth embodiment.

Referring to FIG. 11, the eighth embodiment modifies the control unit 52 of the fifth embodiment by replacing the tap-by-tap cancellation calculator with a tap-by-tap attenuation calculator 21 and adding a power calculator 22 and a long and short attenuation averaging unit 40, and modifies the operation of the step-gain generator 50. The eighth embodiment can also be described as inserting a long and short attenuation averaging unit 40 between the tap-by-tap attenuation calculator 21 and step-gain generator 50 of the sixth embodiment.

The tap-by-tap attenuation calculator 21, power calculator 22, and long and short attenuation averaging unit 40 operate as described in the fourth embodiment. The step-gain generator 50 receives short-term and long-term average attenuation values S_ACOM$_j$(n) and L_ACOM$_j$(n) from the long and short attenuation averaging unit 40, and sets the step gain $\mu_j$ of tap coefficient CL$_j$(n) to a large value $\mu_L$ or a small value $\mu_S$, depending on the difference between S_ACANC$_j$(n) and L_ACANC$_j$(n).

The eighth embodiment provides the combined effects of the fourth and fifth embodiments, including quick and accurate identification of the dynamically changing part of the impulse response of the echo path, together with reduced size, complexity, cost, and power consumption.

Next, a ninth embodiment will be described.

Figure 12:
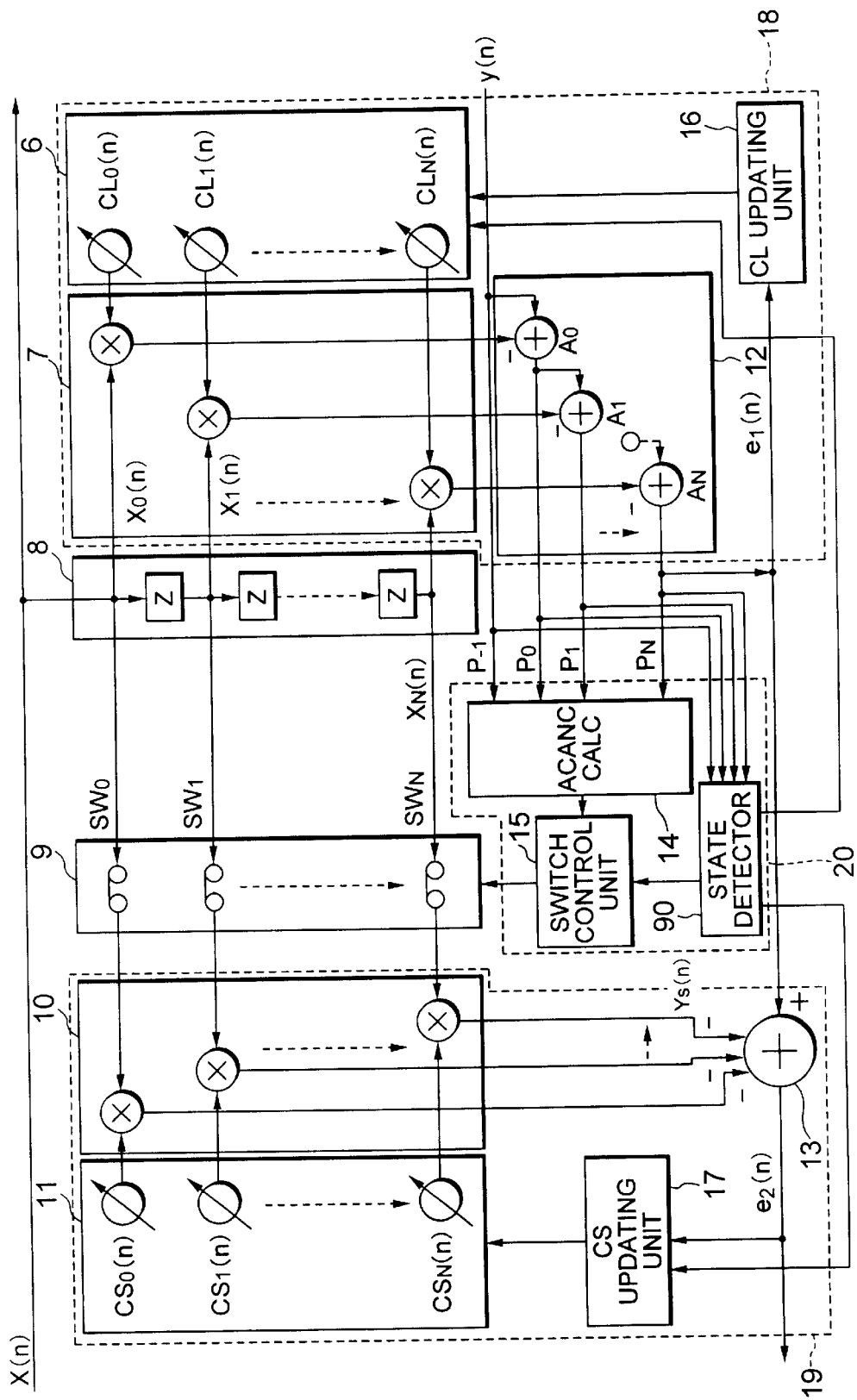
FIG. 12 is a block diagram of an echo canceling apparatus illustrating a ninth embodiment.

Referring to FIG. 12, the ninth embodiment adds a state detector 90 to the control unit 20 of the first embodiment. The state detector 90 is a type of double-talk detector that detects the double-talk state on the basis of the inputs and outputs $P_{-1}$ to $P_N$ of the subtractors in cancellation unit 12. In the double-talk state, the state detector 90 disables the operation of the switch control unit 15 and the coefficient updating units 16, 17.

To detect the double-talk state, the state detector 90 calculates the following differences $\Delta P_j(n)$.

$$\Delta P_j(n) = |P_{j-1}(n)| - |P_j(n)|$$

While calculating these N+1 values (j=0, 1, . . . , N), the state detector 90 also counts the number of times the following condition is satisfied.

$$\Delta P_j(n) > 0$$

This condition means that the amplitude of the signal $P_{j-1}(n)$ input the j-th subtractor $A_j$ in cancellation unit 12 is reduced by the subtraction operation performed by the j-th subtractor $A_j$. In other words, the state detector 90 counts the number of subtractors that reduce the amplitude of the outgoing signal. This count will be denoted SNGL.

The state detector 90 compares SNGL with a predetermined threshold TH_EP equal to, for example thirty percent of the length of the long-response echo canceler 18 (substantially 30% of N) The basis for this threshold is that echo signals in general exhibit exponential decay. Even when part of the impulse response of the echo path is changing dynamically, the terminal end of the impulse response still tends to decay exponentially. The absolute value of the impulse response thus tends to decrease monotonically in the terminal portion of the response, even when dynamic changes are taking place in more forward portions. The threshold TH_EP corresponds to the approximate length of this terminal portion.

If the count SNGL exceeds the threshold TH_EP, the state detector 90 enables the operation of the switch control unit 15 and coefficient updating units 16, 17. In this state, the ninth embodiment operates in the same way as the first embodiment. This state includes both the single-talk state with an unchanging echo path, and the single-talk state with a dynamically changing echo path. Single-talk, in this context, means that the near-end party is silent.

If the count SNGL does not exceed the threshold TH_EP, the state detector 90 recognizes the double-talk state. The condition for double-talk detection is accordingly the following.

$$SNGL \leq TH\_EP$$

Double-talk, in this context, means that the near-end party is speaking. In the double-talk state, since the switch control unit 15 and coefficient updating units 16, 17 are disabled, none of the tap coefficients in the coefficient registers 6, 11 are updated, and all of the switching elements in the switching unit 9 are opened. The short-response echo canceler 19 is thus completely disabled. Echo cancellation is carried out only by the long-response echo canceler 18, using fixed tap coefficients.

By detecting the double-talk state in this way, the ninth embodiment distinguishes between disturbances due to changes in the echo path, which require compensation by the short-response echo canceler 19, and disturbances due to near-end speech, which require that the short-response echo canceler 19 stop operating in order to avoid possible severe degradation of the outgoing signal. The ninth embodiment thus maintains the improved echo cancellation provided by the first embodiment in the single-talk state, while suppressing possibly adverse effects of short-response echo cancellation in the double-talk state.

The state detector 90 of the ninth embodiment can also be added to the echo canceling apparatus in the second to eighth embodiments, with similar effects. In the fifth to eighth embodiments, these effects are achieved simply by disabling the long-response coefficient updating unit 16 in the double-talk state.

Next, a tenth embodiment will be described.

Figure 13:
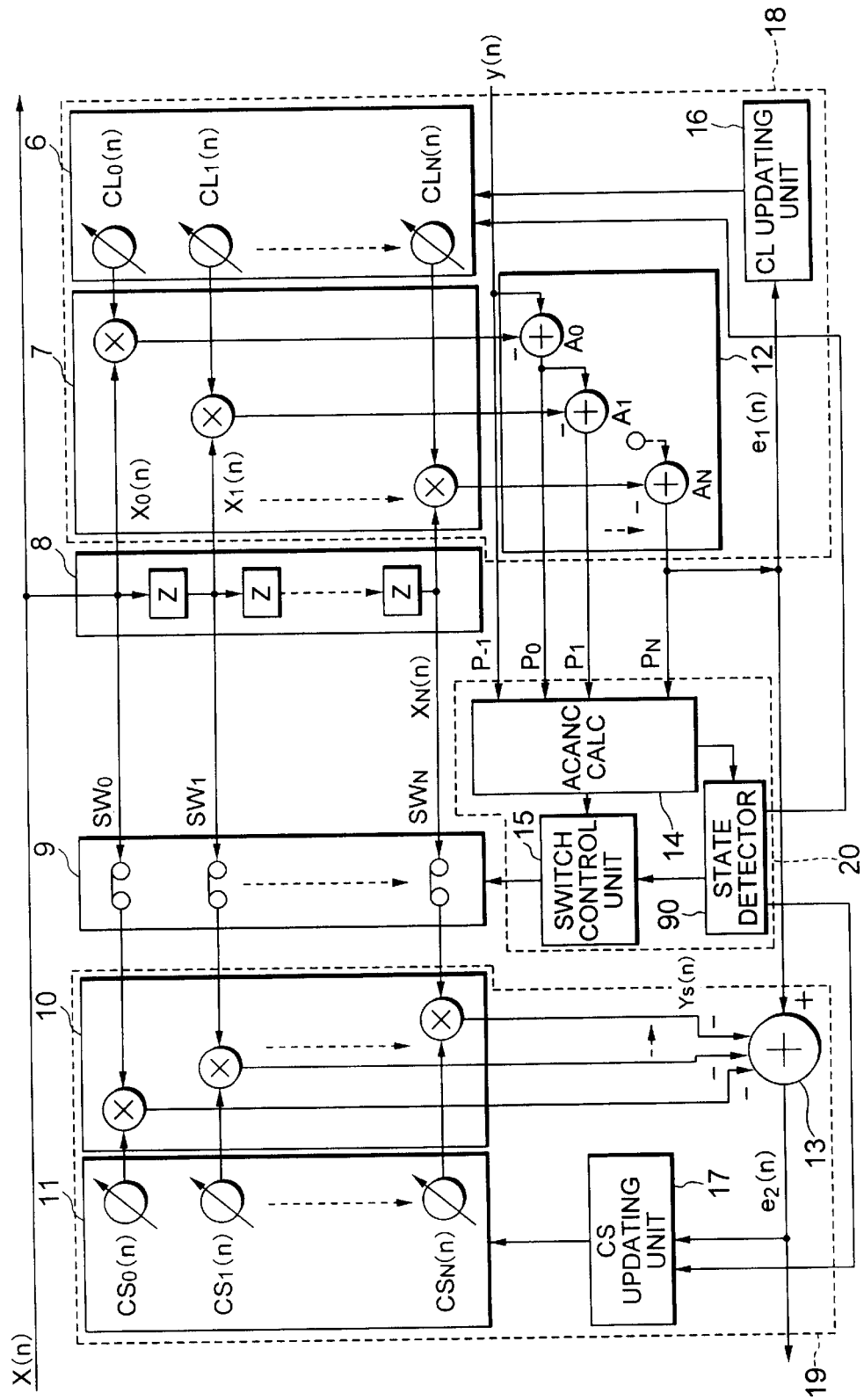
FIG. 13 is a block diagram of an echo canceling apparatus illustrating a tenth embodiment.

Referring to FIG. 13, the tenth embodiment also adds a state detector 90 to the control unit 20 of the first embodiment. The state detector 90 in the tenth embodiment receives the echo cancellation values $ACANC_j(n)$ calculated by the tap-by-tap cancellation calculator 14, instead of receiving the input and output values of cancellation unit 12. Aside from this difference in input values, however, the state detector 90 operates substantially as described in the ninth embodiment.

Specifically, the state detector 90 calculates the following differences $\Delta ACANC_j(n)$ (j=1, ..., N).

$$\Delta ACANC_j(n) = |ACANC_{j-1}(n)| 31\ |ACANC_j(n)|$$

The state detector 90 also counts the number of times the following condition is satisfied.

$$\Delta ACANC_j(n) > 0$$

The resulting count will again be denoted SNGL. The state detector 90 compares SNGL with a predetermined threshold TH_EP equal to, for example, thirty percent of N, recognizes the single-talk state when SNGL exceeds TH_EP, and recognizes the double-talk state when SNGL does not exceed TH_EP.

In the single-talk state, the state detector 90 enables the switch control unit 15 and coefficient updating units 16, 17, and the tenth embodiment operates as described in the first embodiment. In the double-talk state, the state detector 90 disables the switch control unit 15 and coefficient updating units 16, 17, all of the switching elements in the switching unit 9 are opened, and the short-response echo canceler 19 stops operating.

The tenth embodiment provides effects similar to the effects of the ninth embodiment.

The state detector 90 of the tenth embodiment can also be added to the third, fifth, or seventh embodiment.

Next, an eleventh embodiment will be described.

Figure 14:
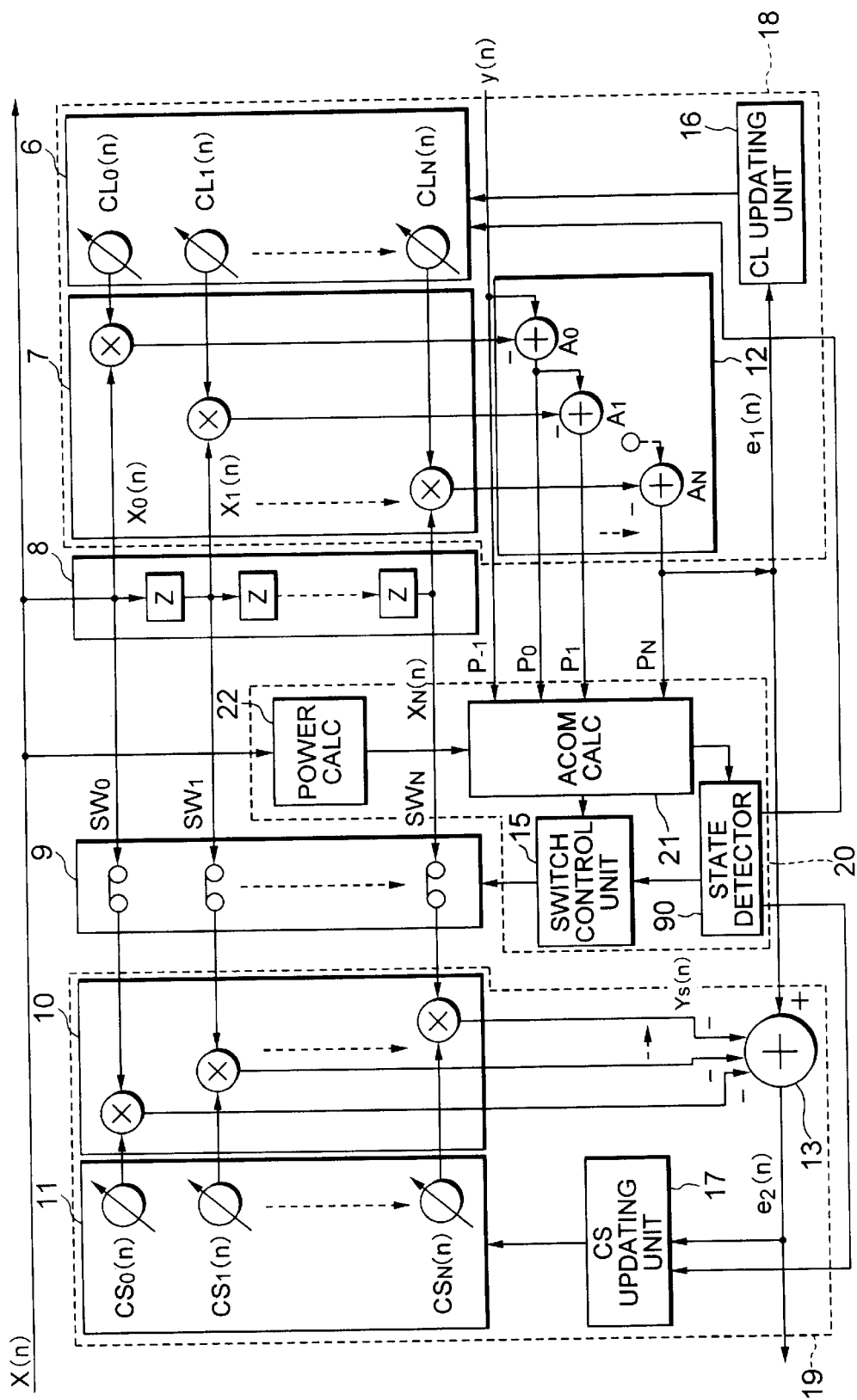
FIG. 14 is a block diagram of an echo canceling apparatus illustrating an eleventh embodiment.

Referring to FIG. 14, the eleventh embodiment adds a state detector 90 to the control unit 20 of the second embodiment. The state detector 90 in the eleventh embodiment receives the echo attenuation values $ACOM_j(n)$ calculated by the tap-by-tap attenuation calculator 21, and operates on these values substantially as described in the ninth and tenth embodiments.

Specifically, the state detector 90 calculates the following differences $\Delta ACOM_j(n)$ (j=1, ..., N).

$$\Delta ACOM_j(n) = |ACOM_{j-1}(n)| - |ACOM_j(n)|$$

The state detector 90 also counts the number of times the following condition is satisfied.

$$\Delta ACOM_j(n) > 0$$

The resulting count will once again be denoted SNGL. The state detector 90 compares SNGL with a predetermined threshold TH_EP equal to, for example, thirty percent of N, recognizes the single-talk state when SNGL exceeds TH_EP, and recognizes the double-talk state when SNGL does not exceed TH_EP.

In the single-talk state, the state detector 90 enables the switch control unit 15 and coefficient updating units 16, 17, and the eleventh embodiment operates as described in the second embodiment. In the double-talk state, the state detector 90 disables the switch control unit 15 and coefficient updating units 16, 17, all of the switching elements in the switching unit 9 are opened, and the short-response echo canceler 19 stops operating.

The eleventh embodiment adds effects similar to the effects of the ninth and tenth embodiments to the effects provided by the second embodiment.

The state detector 90 of the eleventh embodiment can also be added to the fourth, sixth, or eighth embodiment.

Next, a twelfth embodiment will be described. The twelfth embodiment replaces the state detector of the ninth embodiment with an echo detector that looks specifically for the type of monotonic decay to be expected in an echo signal.

Figure 15:
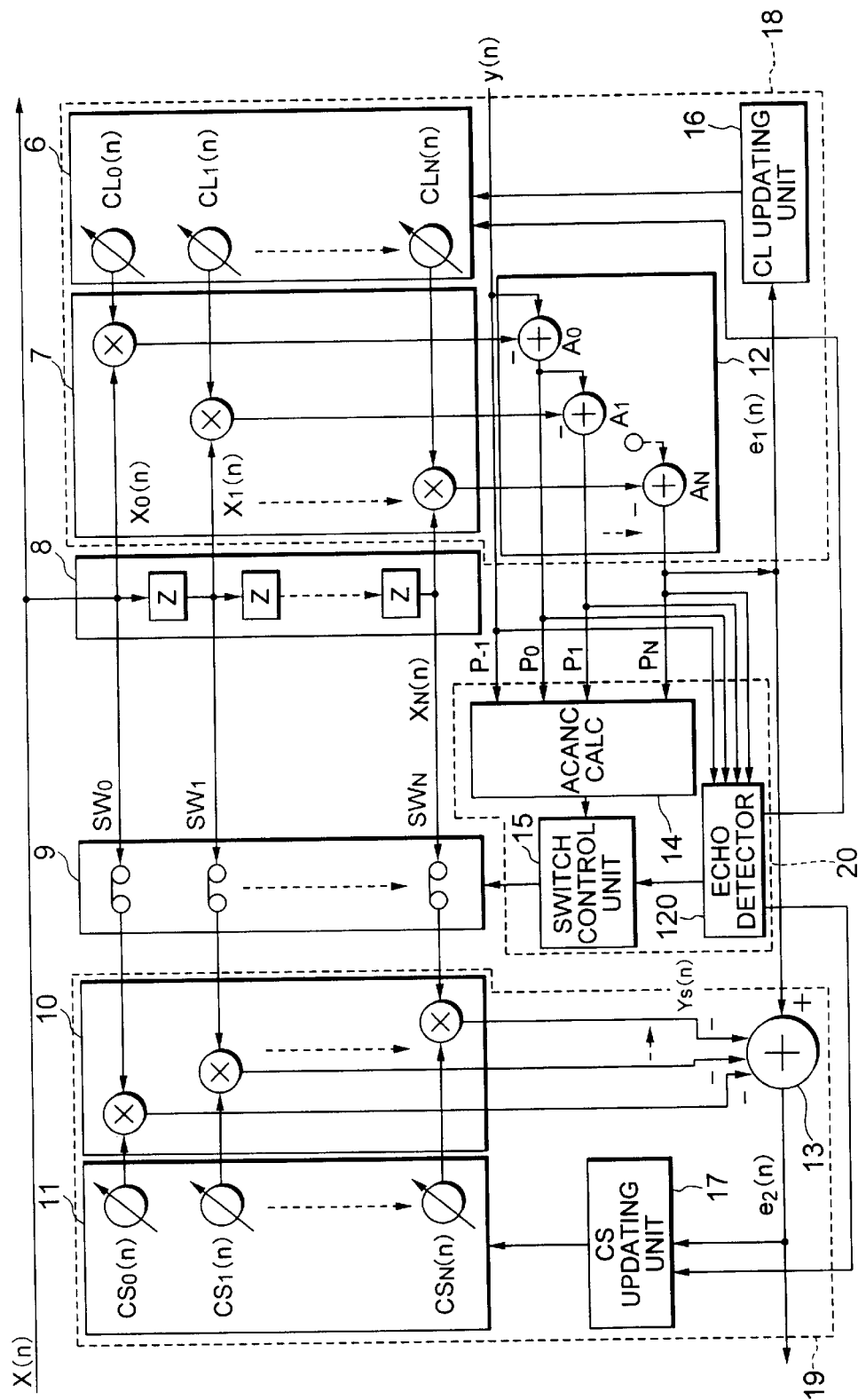
FIG. 15 is a block diagram of an echo canceling apparatus illustrating a twelfth embodiment.

Referring to FIG. 15, the echo detector 120 receives the input and output values $P_{-1}$ to $P_N$ of cancellation unit 12, obtains their absolute values, calculates the differences $\Delta P_j(n)$ from j=0 to j=N, and counts the number of times $\Delta P_j(n)$ is greater than zero, as in the ninth embodiment. The count thus obtained, denoted SNGL, indicates the number of times the absolute values of $P_{-1}$ to $P_N$ decrease, from one to the next, as explained in the ninth embodiment.

The echo detector 120 also maintains a count CONTP of consecutive decreases in the absolute value of $P_j$ from j=0 to j=N. The initial value of CONTP is zero. While calculating $\Delta P_j(n)$, the echo detector 120 holds the previously calculated value $\Delta P_j(n)$ in a register (not visible). If $\Delta P_j(n)$ and $\Delta P_j(n)$ are both greater than zero, the count CONTP is incremented by one. If either $\Delta P_j(n)$ or $\Delta P_{j-1}(n)$ is not greater than zero, the count CONTP is cleared to zero.

The echo detector 120 compares the maximum value of the count CONTP with a predetermined threshold TH_EP_CONT equal to, for example, twenty percent of the length of the long-response echo canceler 18 (TH_EP_CONT=20% of N), and sets a signal flag EP_CONT according to the result. EP_CONT is set to one, indicating the single-talk state, if the following condition is satisfied.

TH_EP_CONT≦CONTP

EP_CONT is cleared to zero, indicating the double-talk state, if the following condition is satisfied.

TH_EP CONT>CONTP

The echo detector 120 recognizes the single-talk state only if both counts SNGL and CONTP indicate the single-talk state (that is, only if EP_CONT=1 and SNGL>TH_EP). In the single-talk state, the echo detector 120 enables the switch control unit 15 and coefficient updating units 16, 17, and the twelfth embodiment operates as described in the first embodiment. If either count SNGL or CONTP indicates the double-talk state, the state detector 90 disables the switch control unit 15 and coefficient updating units 16, 17, so that no tap coefficients are updated and the short-response echo canceler 19 stops operating.

The single-talk detection criteria are more stringent in the twelfth embodiment than in the ninth embodiment. In the ninth embodiment, even in the double-talk state, random variations may produce more than the threshold number of positive values of $\Delta P_j(n)$, scattered at various locations from j=0 to j=N. In the twelfth embodiment, such scattered occurrences are not considered to indicate the single-talk state. The single-talk state is recognized only if there is also a long, continuous decreasing trend in the outgoing signal amplitude, indicated by consecutive positive values of $\Delta P_j(n)$, as successive parts of the first echo replica signal are subtracted from the outgoing signal.

Compared with the ninth embodiment, the twelfth embodiment provides a higher degree of protection from adverse effects caused by operation of the short-response echo canceler 19 in the double-talk state.

In a variation of the twelfth embodiment, the echo detector 120 maintains only the consecutive count CONTP, and recognizes the single-talk state on the basis of CONTP alone. Similar effects are obtained, as the CONTP criterion by itself is still more stringent than the SNGL criterion used in the ninth embodiment.

In other variations of the twelfth embodiment, the echo detector 120 replaces the state detector 90 in the tenth embodiment or eleventh embodiment, and counts consecutive decreases in the absolute value of $ACANC_j(n)$ or $ACOM_j(n)$. The echo detector 120 can also be used as a double-talk detector in the fifth to eighth embodiments, to halt updating of the tap coefficients $CL_j(n)$ in the double-talk state.

Next, a thirteenth embodiment will be described.

Figure 16:
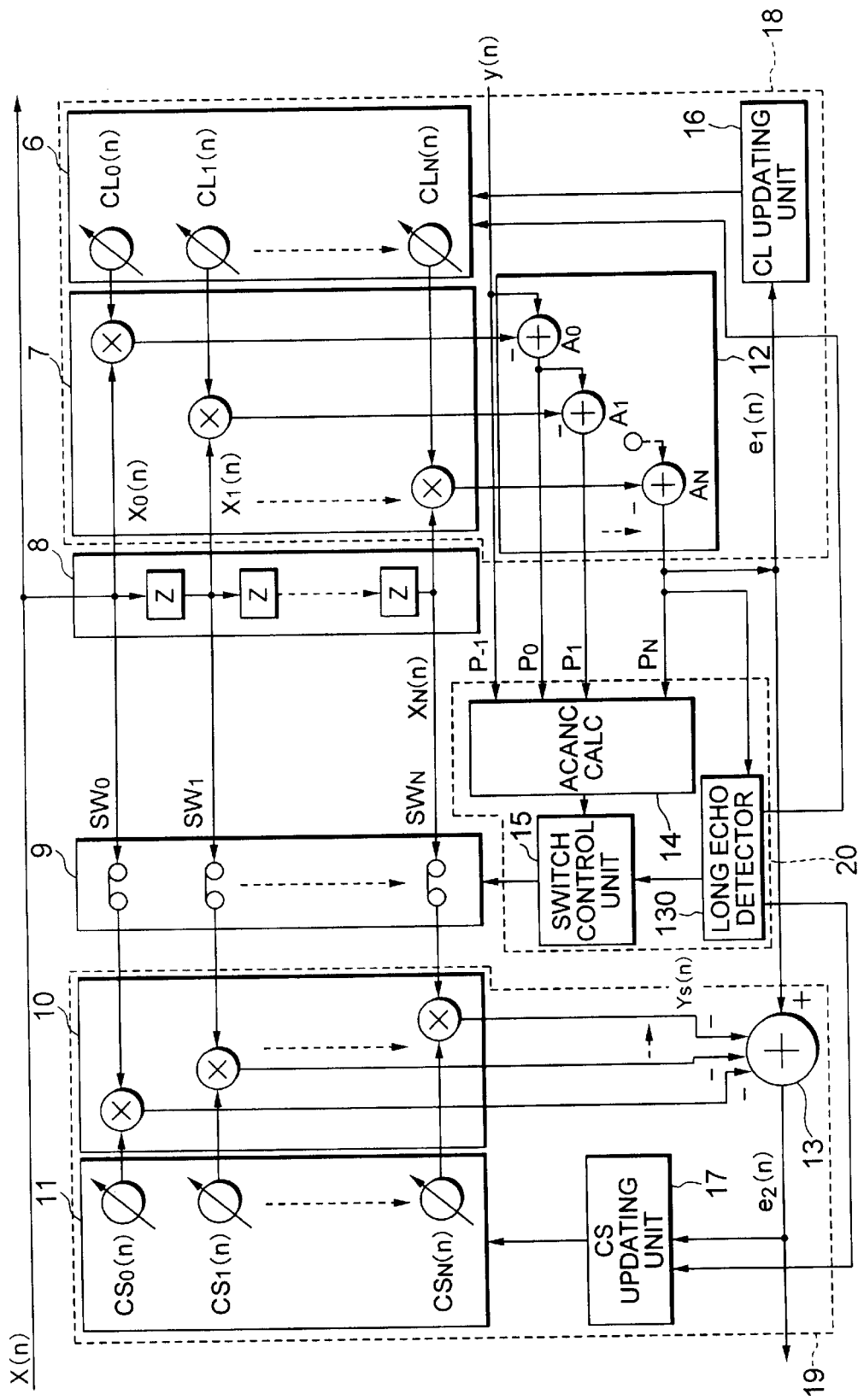
FIG. 16 is a block diagram of an echo canceling apparatus illustrating a thirteenth embodiment.

Referring to FIG. 16, the thirteenth embodiment replaces the echo detector of the twelfth embodiment with a long echo detector 130. The long echo detector 130 checks for continuously decreasing absolute values in a last group of values $P_j$ received from cancellation unit 12. For example, the long echo detector 130 examines the last twenty-one values, from $P_{N-20}$ to $P_N$. The single-talk state is detected if, within this group of values, there is a consecutive sequence of consecutively decreasing absolute values with a length of at least TH_EP_CONT. That is, the criterion introduced in the twelfth embodiment is applied to the terminal part of the echo.

Changes in the echo path generally occur when a person shifts position or moves about. These changes usually do not affect the terminal part of the impulse response of the echo path, which is due to acoustic reflection from stationary objects such as walls. By examining only a terminal group of values, the long echo detector 130 is able to detect the single-talk and double-talk states while ignoring the effects of dynamic changes in the echo path.

The thirteenth embodiment accordingly provides substantially the same effects as the twelfth embodiment, but requires less processing. The long echo detector 130 in the thirteenth embodiment operates more quickly and more efficiently than the echo detector in the twelfth embodiment.

The long echo detector 130 of the thirteenth embodiment can also be used in place of the state detector 90 of the tenth or eleventh embodiment.

Next, a fourteenth embodiment will be described.

As noted above, the impulse response of the echo path tends to exhibit exponential decay, but there are often small-scale variations within the decaying trend, and further variations appear when the impulse response is convolved with the incoming signal X(n). The fourteenth embodiment accordingly checks for a large-scale decaying trend or decreasing envelope, while ignoring small-scale variations.

Figure 17:
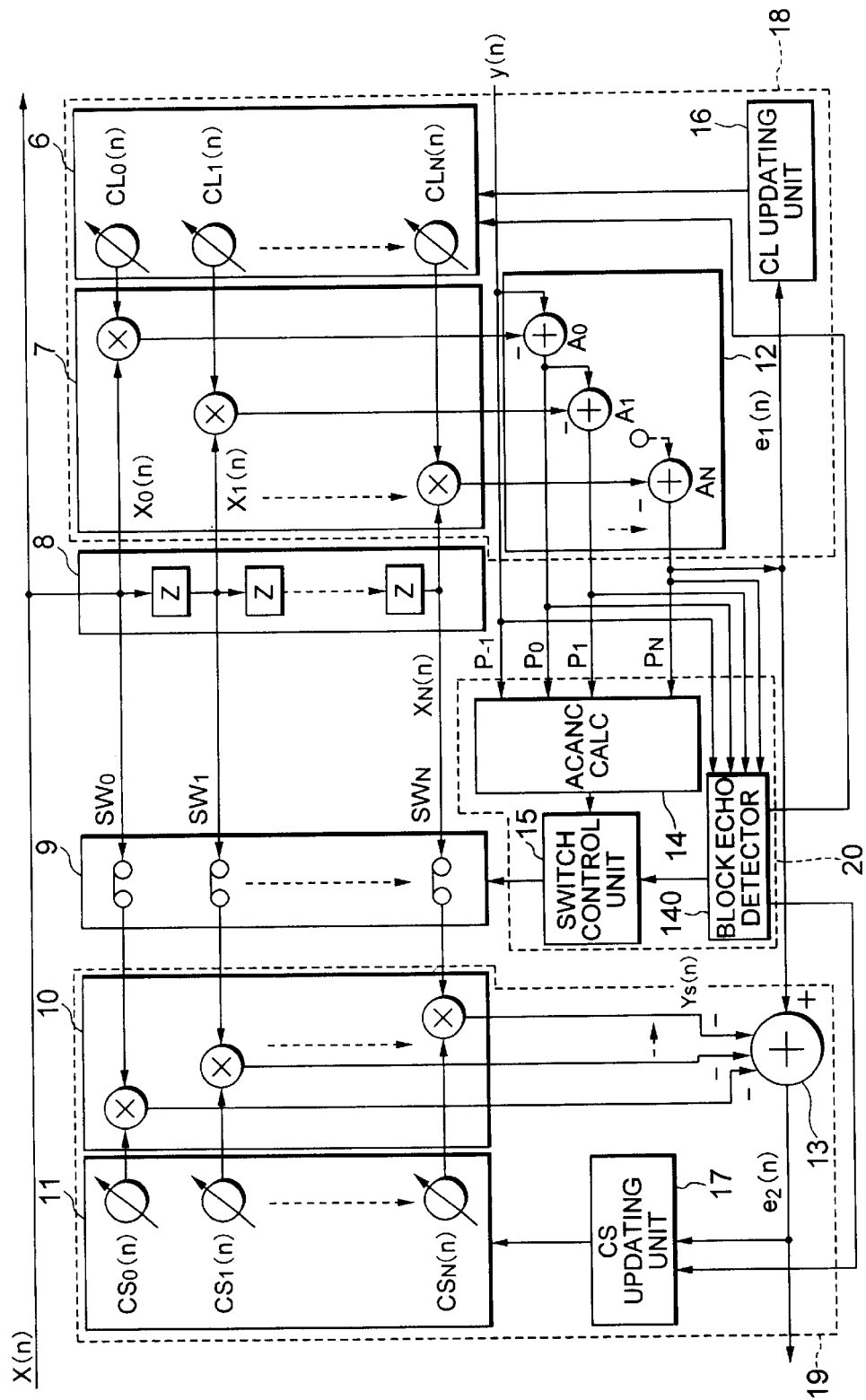
FIG. 17 is a block diagram of an echo canceling apparatus illustrating a fourteenth embodiment.

Referring to FIG. 17, the fourteenth embodiment replaces the echo detector of the twelfth embodiment with a block echo detector 140. The block echo detector 140 divides the subtractors in cancellation unit 12 into consecutive blocks of, for example, twenty subtractors each. Within each block, the block echo detector 140 counts the number of subtractors that decrease the outgoing signal amplitude, as described in the ninth embodiment. The count thus obtained in the J-th block will be denoted $SNGL\_BL_J$(J=1, 2, . . . ). This count is used as a single representative value for the J-th block. The block echo detector 140 also calculates the following block-to-block differences $\Delta SNGLBL_J$.

$$\Delta SNGL\_BL_J = SNGL\_BL_{J-1} - SNGL\_BL_J$$

Following the approach taken in the twelfth embodiment, the block echo detector 140 increments a count CONTP by one if $\Delta SNGL\_BL_J$ is greater than zero, clears CONTP to zero if $\Delta SNGL\_BL_J$ is equal to or less than zero, compares CONTP with a threshold TH_EP_CONT, and sets a flag EP_CONT to zero or one, depending on whether or not CONTP is less than TH_EP_CONT. The double-talk state is recognized if CONTP is less than TH_EP_CONT. The single-talk state is recognized if CONTP is equal to or greater than TH_EP_CONT.

The block echo detector 140 succeeds in detecting the single-talk state despite small-scale variations that might cause detection of the double-talk state in the preceding embodiments. With a suitable threshold value TH_EP_CONT, the block echo detector 140 also detects the single-talk state despite dynamic changes in the echo path. The block echo detector 140 enables the switch control unit 15 and coefficient updating units 16, 17 to operate in the single-talk state but not in the double-talk state, providing effects generally similar to the effects of the ninth to thirteenth embodiments, but with improved single-talk detection.

The fourteenth embodiment can be modified by using a different representative value, instead of $SNGL\_BL_J$, for each block.

The ninth to fourteenth embodiments can also be modified by using a conventional double-talk detector to detect the double-talk state, and disabling the operation of the short-response echo canceler 19 in the double-talk state. With this modification, the invention can be practiced in apparatus in which the second echo replica signal has a fixed length.

The fifth to eighth embodiments can be modified by shifting the function of identifying the tap coefficients corresponding to the dynamically changing echo component completely into the control unit 52.

The invention is not limited to the specific threshold values, step gains, and other values described in the embodiments.

The invention is not limited to the specific mathematical formulas given in the embodiments for calculating the echo cancellation characteristics of the individual taps. Time-averaged cancellation values and time-averaged attenuation values may be calculated by other formulas, or other echo cancellation characteristics may be calculated.

The invention can be practiced either in hardware or in software.

Those skilled in the art will recognize that further variations are possible within the scope claimed below.

What is claimed is:

1. An echo canceling apparatus receiving an incoming signal from a far-end source and an outgoing signal from a near-end source, for removing an echo of the incoming signal from the outgoing signal, comprising:

a tapped delay unit storing a plurality of most recent samples of the incoming signal, having a plurality of taps for output of respective stored samples;

a long-response echo canceler coupled to the tapped delay unit, generating a first echo replica signal from the samples output from said taps, and subtracting the first echo replica signal from the outgoing signal, thereby obtaining a first residual signal;

a control unit coupled to the tapped delay unit, calculating an echo cancellation characteristic for each tap of the tapped delay unit, thereby identifying a variable number of said taps corresponding to a changing component of the echo, said variable number having zero as a possible value, by calculating, for each tap of the tapped delay unit, two time-averaged cancellations or attenuations produced by the long-response echo canceler from the samples output from said tap, using different time constants, and identifying the taps corresponding to the changing component of the echo by comparing said two time-averaged cancellations or attenuations;

a switching unit coupled to the tapped delay unit, selecting the samples output from the taps identified by the control unit; and a short-response echo canceler coupled to the switching unit, generating a second echo replica signal from the samples selected by the switching unit, when the number of selected samples is greater than zero, and subtracting the second echo replica signal from the first residual signal, thereby obtaining a second residual signal for transmission to the far-end source.

2. An echo canceling apparatus receiving an incoming signal from a far-end source and an outgoing signal from a near-end source, convolving a plurality of most recent samples of the incoming signal with a certain number of tap coefficients to generate an echo replica signal, subtracting the echo replica signal from the outgoing signal to remove an echo of the incoming signal from the outgoing signal, and adaptively adjusting the tap coefficients, comprising:

a control unit calculating an echo cancellation characteristic for each tap coefficient, thereby identifying a variable number of said tap coefficients corresponding to a changing component of said echo, said variable number having zero as a possible value, by calculating, for each said tap coefficient, two time-averaged cancellations or attenuations produced by said tap coefficient, using different time constants, and identifying the tap coefficients corresponding to the changing component of the echo by comparing the two time-averaged cancellations or attenuations; and a step-gain generator coupled to the control unit, generating a plurality of step gains determining rates of adjustment of respective tap coefficients, and changing said step gains to increase the rates of adjustment of the tap coefficients identified by the control unit.

3. An echo canceling apparatus receiving an incoming signal from a far-end source and an outgoing signal from a near-end source, for removing an echo of the incoming signal from the outgoing signal, comprising:

a tapped delay unit storing a plurality of most recent samples of the incoming signal;

a long-response echo canceler, coupled to the tapped delay unit, canceling a comparatively long and unchanging component of said echo by operating on the samples stored in the tapped delay unit;

a short-response echo canceler, coupled to the tapped delay unit, canceling a comparatively short and changing component of said echo by operating on a subset of the samples stored in the tapped delay unit; and a control unit coupled to the long-response echo canceler, detecting whether the near-end source is silent by counting decreasing parts of the component canceled by the long-response echo canceler, and disabling the short-response echo canceler when the near-end source is not silent.

4. The echo canceling apparatus of claim 3, wherein the control unit detects whether the near-end source is silent by counting consecutively decreasing parts of the component canceled by the long-response echo canceler.

5. The echo canceling apparatus of claim 3, wherein the control unit detects whether the near-end source is silent by counting decreasing parts in a terminal portion of the component canceled by the long-response echo canceler.

6. An echo canceling apparatus receiving an incoming signal from a far-end source and an outgoing signal from a near-end source, for removing an echo of the incoming signal from the outgoing signal, comprising:

a tapped delay unit storing a plurality of most recent samples of the incoming signal;

a long-response echo canceler, coupled to the tapped delay unit, canceling a comparatively long and unchanging component of said echo by operating on the samples stored in the tapped delay unit;

a short-response echo canceler, coupled to the tapped delay unit, canceling a comparatively short and changing component of said echo by operating on a subset of the samples stored in the tapped delay unit; and a control unit coupled to the long-response echo canceler, detecting whether the near-end source is silent by dividing the component canceled by the long-response echo canceler into blocks, obtaining a representative value for each block, and counting consecutive blocks with decreasing representative values.

7. A method of canceling an echo of an incoming signal, received from a far-end source, in an outgoing signal, received from a near-end source, comprising the steps of:

(a) storing a plurality of most recent samples of the incoming signal in a tapped delay unit having a plurality of taps for output of respective stored samples;

(b) generating a first echo replica signal from the samples output from said taps;

(c) subtracting the first echo replica signal from the outgoing signal, thereby obtaining a first residual signal;

(d) calculating an echo cancellation characteristic for each tap of the tapped delay unit by calculating, for each said tap, two time-averaged cancellations or attenuations produced in said step (c) from the samples output from said tap, using different time constants;

(e) identifying, from the echo cancellation characteristics calculated in said step (d), a variable number of said taps, corresponding to a changing component of said echo, said variable number having zero as a possible value by comparing said two time-averaged cancellations or attenuations;

(f) generating a second echo replica signal from the samples output from the taps identified in said step (e), when the number of taps identified in said step (e) is greater than zero; and (g) subtracting the second echo replica signal from the first residual signal, thereby obtaining a second residual signal for transmission to the far-end source.

8. A method of canceling an echo of an incoming signal, received from a far-end source, in an outgoing signal, received from a near-end source, by convolving a plurality of most recent samples of the incoming signal with a certain number of tap coefficients to generate an echo replica signal, subtracting the echo replica signal from the outgoing signal, and adaptively adjusting the tap coefficients, comprising the steps of:

(a) calculating an echo cancellation characteristic for each tap coefficient by calculating, for each said tap coefficient, two time-averaged cancellations or attenuations produced by said tap coefficient, using different time constants;

(b) identifying, from the echo cancellation characteristics calculated in said step (a), a variable number of said tap coefficients corresponding to a changing component of the echo, said variable number having zero as a possible value by comparing said two time-averaged cancellations or attenuations;

(c) generating a plurality of step gains determining rates of adjustment of respective tap coefficients; and (d) changing said step gains to increase the rates of adjustment of the tap coefficients identified in said step (b).

9. A method of canceling an echo of an incoming signal, received from a far-end source, in an outgoing signal received from a near-end source, comprising the steps of:

(a) storing a plurality of most recent samples of the incoming signal;

(b) canceling a comparatively long and unchanging component of said echo by operating on the stored samples;

(c) detecting whether said near-end source is silent by counting decreasing parts of the component canceled in said step (b);

(d) canceling a comparatively short and changing component of said echo by operating on a subset of the stored samples, when the near-end source is silent; and (e) halting cancellation of said comparatively short and rapidly varying component when the near-end source is not silent.

10. The method of claim 9, wherein said step (c) comprises counting consecutively decreasing parts of the component canceled in said step (b).

11. The method of claim 9, wherein said step (c) comprises counting decreasing parts in a terminal portion of the component canceled in said step (b).

12. A method of canceling an echo of an incoming signal, received from a far-end source, in an outgoing signal received from a near-end source, comprising the steps of:

(a) storing a plurality of most recent samples of the incoming signal;

(b) canceling a comparatively long and unchanging component of said echo by operating on the stored samples;

(c) detecting whether said near-end source is silent by dividing the component canceled in said step (b) into blocks, obtaining a representative value for each block, and counting consecutive blocks with decreasing representative values;

(d) canceling a comparatively short and changing component of said echo by operating on a subset of the stored samples, when the near-end source is silent; and (e) halting cancellation of said comparatively short and rapidly varying component when the near-end source is not silent.

* * * * *